US012738237B2

(12) United States Patent
Lee et al.

(10) Patent No.: US 12,738,237 B2
(45) Date of Patent: Sep. 15, 2026

(54) DISPLAY APPARATUS AND ELECTRONIC APPARATUS INCLUDING THE DISPLAY APPARATUS

(71) Applicant: Samsung Display Co., LTD., Yongin-si (KR)

(72) Inventors: Kyeuk Lee, Yongin-si (KR); Sunkwang Kim, Yongin-si (KR); Sihyun Ahn, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/276,303

(22) Filed: Jul. 22, 2025

(65) Prior Publication Data

US 2026/0057843 A1 Feb. 26, 2026

(30) Foreign Application Priority Data

Aug. 22, 2024 (KR) ........................ 10-2024-0113090

(51) Int. Cl.
*G09G 3/32* (2016.01)
*G09G 3/3266* (2016.01)

(52) U.S. Cl.
CPC ... *G09G 3/3266* (2013.01); *G09G 2300/0426* (2013.01); *G09G 2310/08* (2013.01); *G09G 2330/021* (2013.01)

(58) Field of Classification Search
CPC ....... G09G 2300/0426; G09G 2310/08; G09G 2330/021; G09G 3/3233; G09G 3/3266
See application file for complete search history.

(56) References Cited

U.S. PATENT DOCUMENTS

| | | | | |
|---|---|---|---|---|
| 11,929,030 | B2 | 3/2024 | Pang et al. | |
| 12,002,422 | B2 | 6/2024 | Cheng et al. | |
| 12,061,395 | B2 | 8/2024 | Park et al. | |
| 2008/0094009 | A1* | 4/2008 | Koyama | G09G 3/3291 315/307 |
| 2023/0112708 | A1* | 4/2023 | Toyotaka | G06F 3/03545 345/89 |

FOREIGN PATENT DOCUMENTS

| | | | |
|---|---|---|---|
| KR | 1020220160003 | A | 12/2022 |
| KR | 1020230002266 | A | 1/2023 |
| KR | 1020230065290 | A | 5/2023 |

* cited by examiner

*Primary Examiner* — Insa Sadio
(74) *Attorney, Agent, or Firm* — CANTOR COLBURN LLP

(57) ABSTRACT

The display apparatus includes a substrate including a display area and a peripheral area surrounding the display area, a pixel circuit disposed in the display area, and a scan driver disposed in the peripheral area, electrically connected to the pixel circuit, and including a sensing transistor, a first wiring electrically connected to a source electrode of the sensing transistor, and a first capacitor electrically connected to the source electrode of the sensing transistor and a gate electrode of the sensing transistor. The peripheral area includes a wiring arrangement area in which wirings are disposed, and a circuit arrangement area in which at least one transistor is disposed, wherein the circuit arrangement area is between the display area and the wiring arrangement area. The first capacitor is disposed in the wiring arrangement area. The sensing transistor is disposed in the circuit arrangement area.

20 Claims, 13 Drawing Sheets

DISPLAY APPARATUS AND ELECTRONIC APPARATUS INCLUDING THE DISPLAY APPARATUS

This application claims priority to Korean Patent Application No. 10-2024-0113090, filed on Aug. 22, 2024, and all the benefits accruing therefrom under 35 U.S.C. § 119, the content of which in its entirety is herein incorporated by reference.

BACKGROUND

1. Field

One or more embodiments relate to a display apparatus and an electronic apparatus including the display apparatus, and more particularly, to a display apparatus for implementing a slim bezel, and an electronic apparatus including the display apparatus.

2. Description of the Related Art

A display apparatus is configured to receive information regarding images and display images. A display apparatus is used as a display unit of miniaturized products such as, for example, mobile phones, and used as a display unit of large-scale products such as, for example, televisions.

A display apparatus includes a plurality of pixels that receive electrical signals and emit light to display images to the outside. Each pixel includes a light-emitting element. As an example, an organic light-emitting display apparatus includes an organic light-emitting diode OLED as a light-emitting element. Generally, an organic light-emitting display apparatus may include a thin-film transistor and an organic light-emitting diode over a substrate, and the organic light-emitting display apparatus may operate while the organic light-emitting diode emits light spontaneously.

Electronic apparatuses may provide a visual interface for a user through display apparatuses.

Various studies have been carried out to implement display apparatuses having a slimmer bezel.

SUMMARY

One or more embodiments include a display apparatus for implementing a slim bezel. However, such a technical objective is just an example, and the disclosure is not limited thereto.

Additional aspects will be set forth in part in the description which follows and, in part, will be apparent from the description, or may be learned by practice of the presented embodiments of the disclosure.

According to one or more embodiments, a display apparatus includes a substrate including a display area and a peripheral area surrounding the display area, a pixel circuit disposed in the display area, and a scan driver disposed in the peripheral area, electrically connected to the pixel circuit, and including a sensing transistor, a first wiring electrically connected to a source electrode of the sensing transistor, and a first capacitor electrically connected to the source electrode of the sensing transistor and a gate electrode of the sensing transistor, wherein the peripheral area includes a wiring arrangement area in which wirings are disposed, and a circuit arrangement area in which at least one transistor is disposed, wherein the circuit arrangement area is between the display area and the wiring arrangement area, the first capacitor is disposed in the wiring arrangement area, the sensing transistor is disposed in the circuit arrangement area, and the first capacitor includes a first electrode electrically connected to the first wiring, and a second electrode electrically connected to the gate electrode of the sensing transistor.

In an embodiment, the first electrode may be the first wiring.

In an embodiment, a portion of the first wiring may overlap the second electrode in a plan view.

In an embodiment, a portion of the first wiring and the second electrode may be vertically apart from each other.

In an embodiment, the first electrode may be a lower electrode, and the second electrode may be an upper electrode.

In an embodiment, an insulating material may be disposed between the first electrode and the second electrode.

In an embodiment, in a plan view, the first capacitor may be apart from the sensing transistor in a first direction.

In an embodiment, the first wiring may extend in a second direction crossing the first direction.

In an embodiment, the second electrode may include a first portion overlapping the first wiring in a plan view, and a second portion electrically connecting the first portion to the gate electrode of the sensing transistor.

In an embodiment, the first portion may extend in a direction in which the first wiring extends, and the second portion may extend in the first direction.

In an embodiment, a width of the first portion in the first direction may be greater than a width of the second portion in a second direction, and the second direction may cross the first direction.

According to one or more embodiments, a display apparatus includes a substrate including a display area and a peripheral area surrounding the display area, a pixel circuit disposed in the display area, and a scan driver disposed in the peripheral area, electrically connected to the pixel circuit, and including a sensing transistor, a first wiring electrically connected to a source electrode of the sensing transistor, and a first capacitor electrically connected to the source electrode of the sensing transistor and a gate electrode of the sensing transistor, wherein the first capacitor includes a first electrode configured to receive a control signal from a controller, and a second electrode electrically connected to the gate electrode of the sensing transistor, wherein the first electrode is the first wiring.

In an embodiment, the peripheral area includes a wiring arrangement area in which wirings are disposed, and a circuit arrangement area in which at least one transistor is disposed between the display area and the wiring arrangement area, the first capacitor may be disposed in the wiring arrangement area, and the sensing transistor may be disposed in the circuit arrangement area.

In an embodiment, a portion of the first wiring may overlap the second electrode in a plan view.

In an embodiment, a portion of the first wiring and the second electrode may be vertically apart from each other.

In an embodiment, in a plan view, a sensing capacitor may be apart from the sensing transistor in a first direction.

In an embodiment, the first wiring may extend in a second direction crossing the first direction.

According to one or more embodiments, an electronic apparatus includes a controller which generates a scan input signal, a power module which generates a scan input voltage, and a display module including a display panel and a scan driver, wherein the display panel is divided into a display area in which a pixel circuit is disposed, and a peripheral area surrounding the display area, and the scan driver is disposed in the peripheral area, receives the scan input signal and the scan input voltage, and outputs a scan signal to the pixel circuit. The scan driver may include at least one capacitor including one electrode and another electrode, wherein the one electrode is a signal line which transfers at least one of the scan input signal and the scan input voltage, and the other electrode overlaps at least a portion of the signal line in a plan view.

In an embodiment, the peripheral area may include a wiring arrangement area in which wirings are disposed, and a circuit arrangement area in which at least one transistor is disposed, wherein the circuit arrangement area is between the display area and the wiring arrangement area, and the at least one capacitor may be disposed in the wiring arrangement area.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
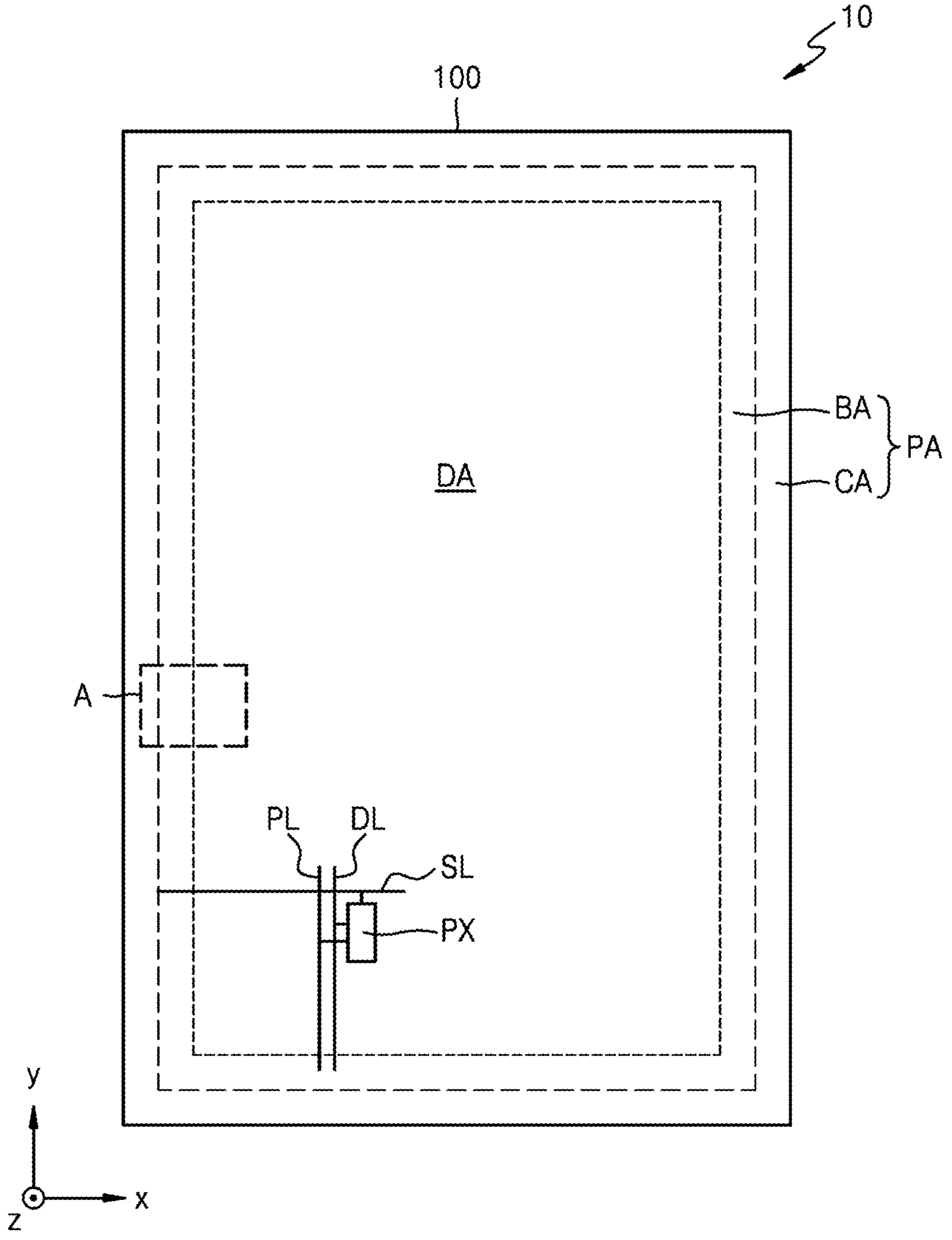
FIG. 1 is a schematic plan view of a display apparatus according to an embodiment.

As the disclosure allows for various changes and numerous embodiments, certain embodiments will be illustrated in the drawings and described in the written description. Effects and features of the disclosure, and methods for achieving them will be clarified with reference to embodiments described herein in detail with reference to the drawings. However, the disclosure is not limited to the following embodiments and may be embodied in various forms.

Hereinafter, embodiments will be described with reference to the accompanying drawings, wherein like reference numerals refer to like elements throughout and a repeated description thereof is omitted.

As used herein, when various elements such as a layer, a region, a plate, and the like are disposed “on” another element, not only the elements may be disposed “directly on” the other element, but another element may be disposed therebetween. As used herein, when various elements such as a layer, a region, a plate, and the like are disposed “under” another element, not only the elements may be disposed “directly under” the other element, but another element may be disposed therebetween.

Sizes of elements in the drawings may be exaggerated or reduced for convenience of explanation. As an example, the size and thickness of each element illustrated in the drawings are arbitrarily represented for convenience of description, and thus, the disclosure is not necessarily limited thereto. That is, for convenience of description, the size, thickness and proportions of elements illustrated in the drawings may be exaggerated and/or simplified for clarity. Therefore, spatially relative terms such as “below”, “lower”, “lower”, “lower”, “above”, “upper”, and the like may be terms used herein to easily describe the relationship of one element or feature.

Terms used to describe space, direction, and the like in this specification are terms for describing the space and direction illustrated in the drawings, but may be understood as terms for describing various other directions or various viewpoints. As an example, in the case an apparatus or element illustrated in the drawing is turned over, the apparatus or element described “below” may be interpreted in a different orientation (e.g., rotated 90 degrees, in the opposite direction, and the like). As an example, in the case an apparatus or element illustrated in the drawing is turned over, the apparatus or element described “on” may be interpreted in a different orientation (e.g., rotated 90 degrees, in the opposite direction, and the like). Accordingly, “below” and “on” may include both upward and downward directions. An apparatus or element may be oriented differently from the drawings, and descriptions of a space or direction described herein may be interpreted in various ways.

The order of processes or the order of methods understood in the description of processing processes, manufacturing methods, and the like in this specification may be different from the described order. For example, two consecutively described processes or methods may be performed at the same time or substantially at the same time, or performed in an order opposite to the described order.

The x-axis direction, the y-axis direction and the z-axis direction are not limited to three axes of the rectangular coordinate system, and may be interpreted in a broader sense. For example, the x-axis direction, the y-axis direction, and the z-axis direction may be perpendicular to one another, or may represent different directions that are not perpendicular to one another.

The terms “first,” “second,” “third” and the like may be used herein to describe specific elements. The terms “first,” “second,” “third” and the like may be used to distinguish one element from another.

When an element is referred to as being “connected to” or “coupled to” another element, it is understood that the element may be connected or coupled to the other element directly or indirectly.

Likewise, when one element is referred to as being “electrically” connected to another element, one element may be directly and electrically connected to the other element, or indirectly and electrically connected to the other element through a conductive element.

When an element is referred to as being “between” two elements, it may be understood that one element is a single element arranged between the two elements, or another element other than the one element is arranged between the two element.

The terms used in this specification are used to describe specific embodiments and are not intended to limit the disclosure. As used herein, the singular forms "a," "an" and "the" are intended to include the plural forms as well, unless the context clearly indicates otherwise.

It will be understood that the expressions "have", "having", "comprises" and "comprising" used herein specify the presence of stated features, integers, operations, factors and/or elements, but do not preclude the presence or addition of one or more other features, integers, operations, factors and/or elements.

For example, the term "and/or" includes any and all combinations of one or more of the associated listed items. For example, "A and/or B" means A or B, or A and B. Expressions such as "at least one" may be used to refer to one or more elements among a plurality of elements. For example, the expressions "at least one of a, b, and c" and "at least one selected from the group consisting of a, b, and c" are "a", "b", "c", "a, b", "b, c", "a, c" or "a, b, c".

For example, terms such as "substantially," "approximately," and similar terms are used as terms of approximation rather than terms of degree, and may be terms to describe inherent variations in measured or calculated values that would be recognized by a person of ordinary skill in the art. For example, use of terms such as "can," "may," and the like may be used to mean "one or more embodiments disclosed herein".

For example, in this specification, when one layer is referred to as having the "same layer structure" as another layer may mean that a plurality of layers included in one layer may be included in the same order in another layer. For example, a plurality of layers included in one layer and a plurality of layers included in another layer may each include the same material and be formed in the same order.

Electronic or electrical devices and/or any other related devices or components (e.g., some of the various modules) according to embodiments of the disclosure described herein may be configured with any suitable hardware, firmware (e.g., for example, it may be implemented using a combination of application-specific integrated circuits), software, firmware, and hardware. For example, the various components of these devices may be formed on one integrated circuit (IC) chip or on separate IC chips. Moreover, the various components of these devices may be formed on a flexible printed circuit film, a tape carrier package (TCP), a printed circuit board (PCB), or on a single substrate. The various components of these devices may be processes or threads, running on one or more processors, executing computer program instructions on one or more computing devices, and interacting with other system components to perform various functions described herein.

Computer program instructions are stored in memory that can be implemented in a computing device using standard memory devices, such as, for example, random access memory (RAM). Computer program instructions may also be stored on other non-transitory computer-readable media, such as, for example, a CD-ROM, flash drive, and the like. One of ordinary skilled in the art will recognize that the functionality of various computing devices may be combined or integrated into a single computing device, or that the functionality of a particular computing device may be dispersed across one or more other computing devices without departing from the spirit and scope of the example embodiments of the present disclosure.

Hereinafter a display apparatus and an electronic apparatus including the same according to an embodiment are described in detail based on the above descriptions.

FIG. 1 is a schematic plan view of a display apparatus according to an embodiment.

As illustrated in FIG. 1, the display apparatus according to an embodiment may include a display panel 10. As long as the display apparatus includes the display panel 10, any display apparatus may be used. As an example, the display apparatus may include various apparatuses such as, for example, smartphones, tablet computers, laptop computers, televisions, advertisement boards, or the like. Because the display apparatus according to an embodiment includes thin-film transistors, a capacitor, and the like, the thin-film transistors, the capacitor, and the like may be implemented by conductive layers and insulating layers.

The display panel 10 may include a liquid crystal display panel, an organic light-emitting display panel, or an inorganic light-emitting display panel, and the type of the display panel 10 is not particularly limited. The display panel 10 may be a rigid type or a flexible type that is rollable or foldable. A display module 1400 may further include a supporter supporting the display panel 10, a bracket, or a heat dissipating member.

The display panel 10 includes a display area DA and a peripheral area PA outside the display area DA. Although it is illustrated in FIG. 1 that the display area DA has a rectangular shape, the disclosure is not limited thereto. The display area DA may have various shapes, for example, circular shapes, elliptical shapes, polygonal shapes, or shapes of specific figures.

The display area DA is a region in which images are displayed, and a plurality of pixels PX may be disposed in the display area DA. Each pixel PX may include a display element such as, for example, an organic light-emitting element. Each pixel PX may be configured to emit, for example, red, green, or blue light. The pixel PX may be connected to a pixel circuit including a thin-film transistor TFT, a storage capacitor, and the like. The pixel circuit may be connected to a scan line SL, a data line DL, and a driving voltage line PL, wherein the scan line SL is configured to transfer scan signals, the data line DL crosses the scan line SL and is configured to transfer data signals, and the driving voltage line PL is configured to supply a driving voltage. The data line DL and the driving voltage line PL may extend in a y axis direction (referred to as a first direction, hereinafter), and the scan line SL may extend in an x axis direction (referred to as a second direction, hereinafter).

The pixel PX may be configured to emit light of a brightness corresponding to an electrical signal from the pixel circuit electrically connected thereto. The display area DA may be configured to display preset images by using light emitted from the pixel PX. For reference, the pixel PX may be defined as an emission area that is configured to emit red, green, or blue light.

The peripheral area PA is a region in which pixels PX are not arranged and may be a region that is configured not to display images. A power supply line for driving the pixel PX and the like may be disposed in the peripheral area PA. In some aspects, pads may be disposed in the peripheral area PA. A printed circuit board including a driving circuit part, an integrated circuit element such as, for example, a driver integrated circuit (IC), and the pads may be electrically connected to each other in the peripheral area PA.

For reference, because the display panel 10 includes a substrate 100, it may be understood that the substrate 100 includes the display area DA and the peripheral area PA. The substrate 100 is described herein in detail.

In some aspects, a plurality of transistors may be disposed in the display area DA. In the plurality of transistors, a first terminal of a transistor may be a source electrode or a drain electrode, and a second terminal may be a different electrode from the first terminal depending on the type (an N-type or P-type) and/or an operation condition of the transistor. As an example, in the case where the first terminal is a source electrode, the second terminal may be a drain electrode.

As an example, the plurality of transistors may include a driving transistor, a data-write transistor, a compensation transistor, an initialization transistor, an emission control transistor, and the like. The driving transistor may be connected between the driving voltage line PL and an organic light-emitting element OLED, and the data-write transistor may be connected to the data line DL and the driving transistor, and may perform a switching operation of transferring a data signal received through the data line DL.

The compensation transistor may be turned on according to a scan signal transferred through the scan line SL and configured to compensate for a threshold voltage of the driving transistor by connecting the driving transistor to the organic light-emitting element OLED.

The initialization transistor may be turned on according to a scan signal transferred through the scan line SL and configured to initialize a gate electrode of the driving transistor by transferring an initialization voltage to the gate electrode of the driving transistor. A scan line connected to the initialization transistor may be a separate scan line different from a scan line connected to the compensation transistor.

The emission control transistor may be turned on according to an emission control signal transferred through an emission control line, and as a result, a driving current may flow through the organic light-emitting element OLED.

The organic light-emitting element may include a pixel electrode (an anode) and an opposite electrode (a cathode) and receive a target voltage from the pixel electrode (the anode) and the opposite electrode (the cathode). The organic light-emitting element may be configured to display images by receiving the driving current from the driving transistor and emitting light.

Hereinafter, although an organic light-emitting display apparatus is described as an example of the display apparatus according to an embodiment, the display apparatus according to the disclosure is not limited thereto. In another embodiment, the display apparatus according to an embodiment may be inorganic light-emitting display apparatus or a quantum-dot light-emitting display apparatus. As an example, an emission layer of the display element of the display apparatus may include an organic material or an inorganic material. In some aspects, the display apparatus may include the emission layer and quantum dots disposed on a path of light emitted from the emission layer.

Figure 2:
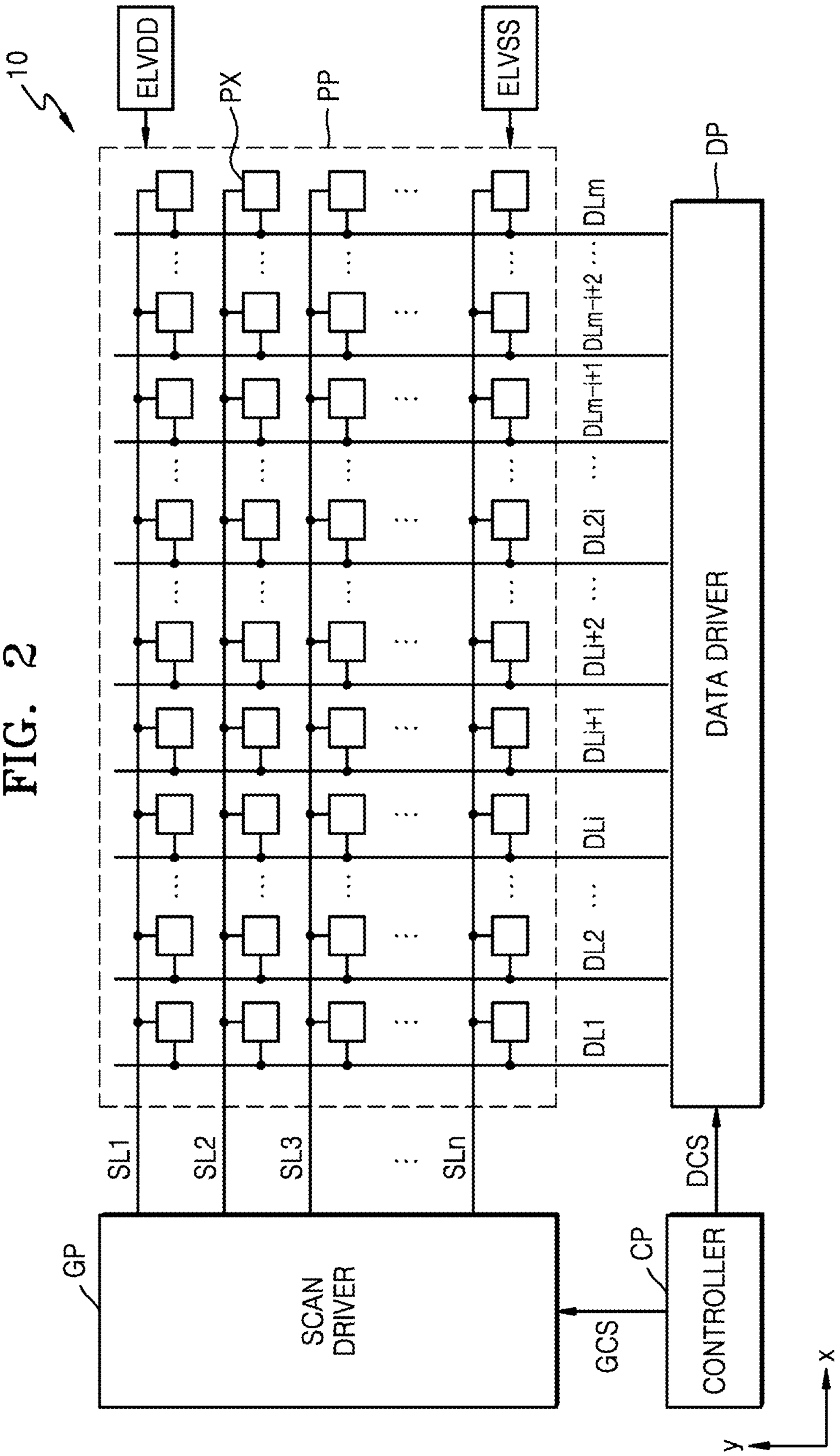
FIG. 2 is a schematic conceptual view of a display apparatus according to an embodiment.

FIG. 2 is a schematic conceptual view of a display apparatus according to an embodiment.

As illustrated in FIG. 2, the display apparatus may include a pixel part PP, a scan driver GP, a data driver DP, and a controller CP.

The pixel part PP in which a plurality of pixels PX are disposed may be provided in the display area DA. A scan driver GP, the data driver DP, and the controller CP may be provided in the peripheral area PA.

Each of the plurality of pixels PX may be connected to a corresponding scan line among a plurality of scan lines SL1, SL2, SL3, . . . , and SLn, and a corresponding data line among a plurality of data lines DL1, DL2, . . . , DLi, DLi+1, DLi+2, . . . , DL2*i*, . . . , DLm−i+1, DLm−i+2, . . . , and to DLm. Where, n is a positive integer, m is a positive integer, and i a positive integer less than or equal to m. Each of the plurality of scan lines SL1 to SLn may extend in a first direction (e.g., an x axis direction, a row direction) and be connected to pixels PX located in the same row. Each of the plurality of scan lines SL1 to SLn may transfer a scan signal to the pixels PX in the same line. Each of the plurality of data lines DL1 to DLm may extend in a second direction (e.g., a y axis direction, a column direction) and be connected to pixels PX located in the same column.

The scan driver GP may be connected to the plurality of scan lines SL1 to SLn, may generate scan signals in response to a gate driving control signal GCS from the controller CP, and sequentially supply the scan signals to the plurality of scan lines SL1 to SLn. In an example in which scan signals are sequentially supplied to the scan lines SL1 to SLn, pixels PX may be selected on a row basis. Each of the data lines DL1 to DLm may transfer data signals DATA to the pixels PX in the selected row. The scan line may be connected to a gate of a transistor included in the pixel PX. A scan signal may be a gate control signal controlling a turn-on and a turn-off of a transistor connected to the scan line. A scan signal may be a square wave signal in which an on-voltage by which a transistor may be turned on, and an off-voltage by which a transistor may be turned off are repeated.

The scan driver GP is a driving chip and may be mounted on the display panel 10. In some aspects, the scan driver GP may be integrated in the display panel 10. As an example, the scan driver GP may include an amorphous silicon TFT gate driver circuit (ASG), a low temperature polycrystalline silicon (LTPS) TFT gate driver circuit, or an oxide semiconductor TFT gate driver circuit (OSG) embedded in the display panel 10.

The data driver DP may convert an image signal into a data signal in the form of a voltage or current according to a data driving control signal DCS input from the controller CP.

The controller CP may generate a data driving control signal DCS and a gate driving control signal GCS in response to synchronization signals or a clock signal supplied from the outside. As an example, the controller CP may be a controller 1120-1 of FIG. 13 described herein, or an element including the controller 1120-1. The controller CP may output a data driving control signal DCS to the data driver DP and output a gate driving control signal GCS to the scan driver GP.

The scan driver GP may be directly formed on the substrate 100. The data driver DP may be disposed on a flexible printed circuit board (FPCB) electrically connected to a pad disposed on one side of the substrate 100. In another embodiment, the data driver DP may be directly disposed on the substrate 100 in a chip-on-glass (COG) or chip-on-plastic (COP) method.

Figure 3:
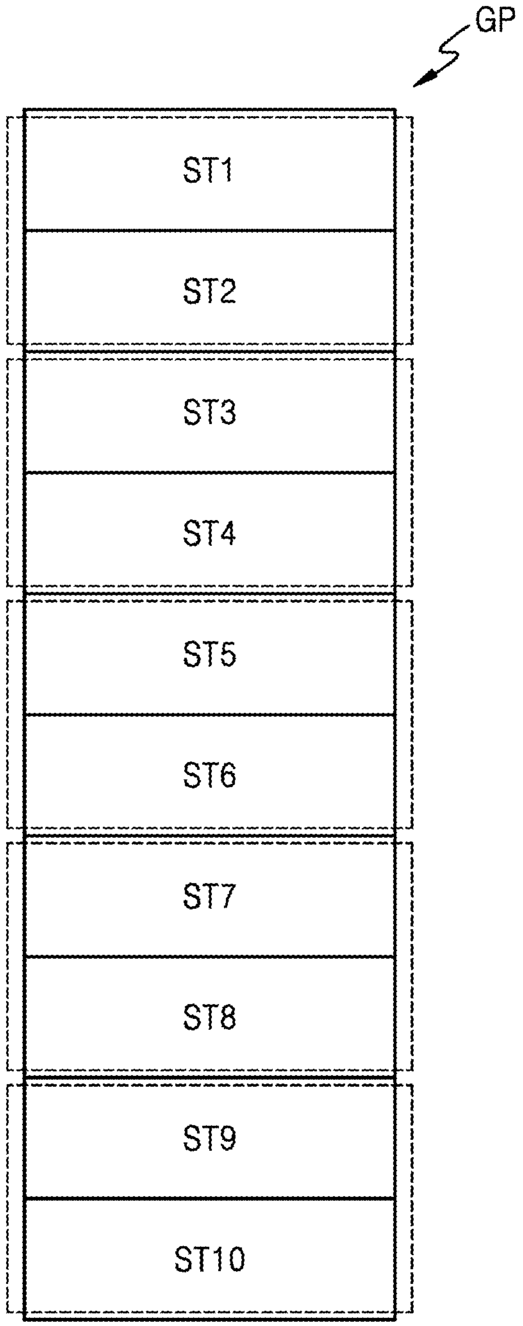
FIG. 3 is a block diagram of stages of a scan driver of FIG. 2.

FIG. 3 is a block diagram of stages of the scan driver GP of FIG. 2.

Referring to FIG. 3, the scan driver GP may include a plurality of stages ST1 to ST10. Although, for convenience of description, ten stages are illustrated, one stage may output one scan signal, and the number of stages may correspond to the number of gate lines.

Among the stages, two adjacent stages may form a stage pair. As an example, a first stage pair may include a first stage ST1 and a second stage ST2. As an example, a second stage pair may include a third stage ST3 and a fourth stage ST4. As an example, a third stage pair may include a fifth stage ST5 and a sixth stage ST6. As an example, a fourth stage pair may include a seventh stage ST7 and an eighth stage ST8. As an example, a fifth stage pair may include a ninth stage ST9 and a tenth stage ST10.

Two stages in the stage pair may include switching elements directly connected to each other. In some aspects, two stages in the stage pair may share at least one input signal.

Figure 4:
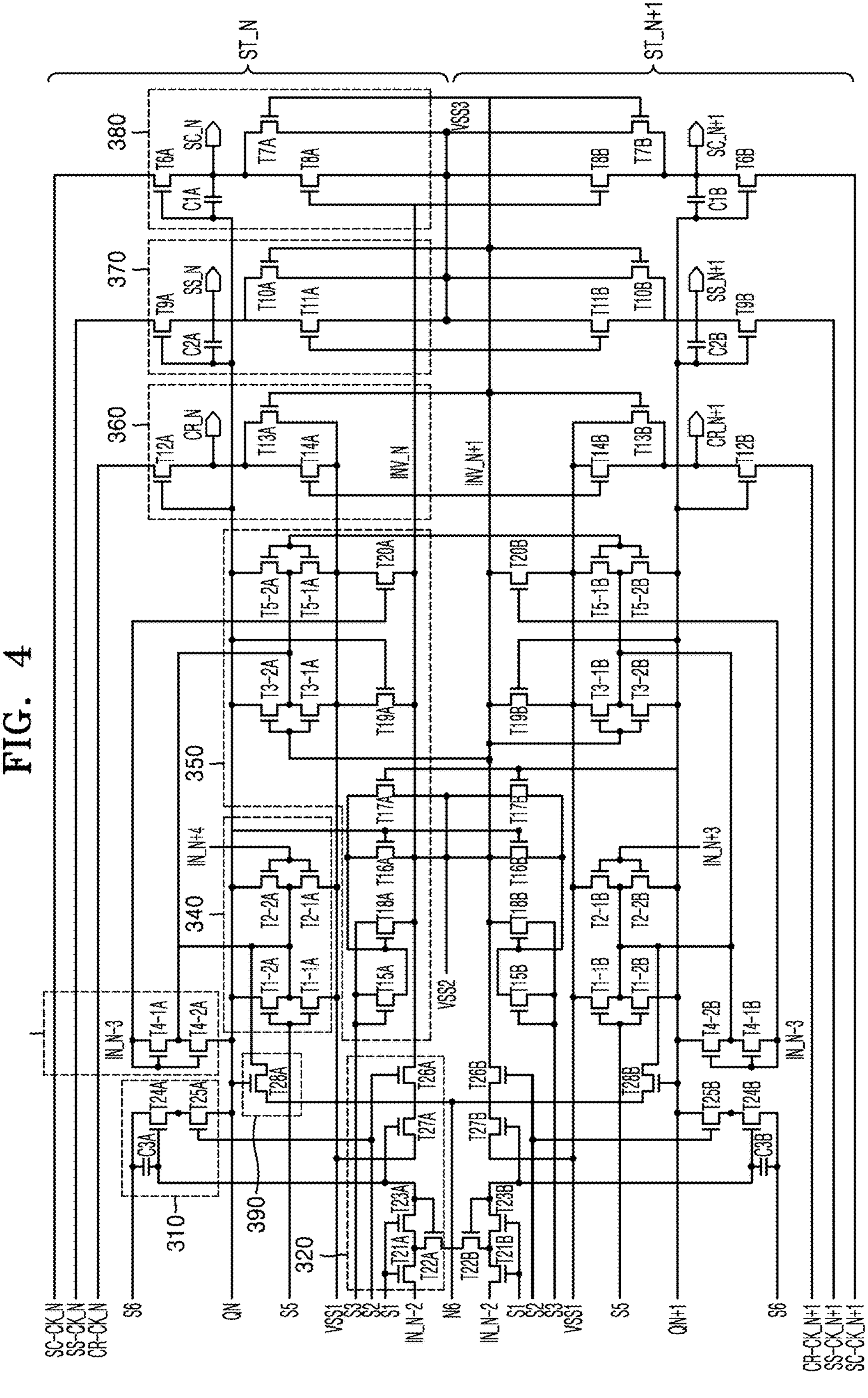
FIG. 4 is a circuit diagram of an N-th stage and an (N+1)-th stage of the scan driver of FIG. 2.
Figure 5:
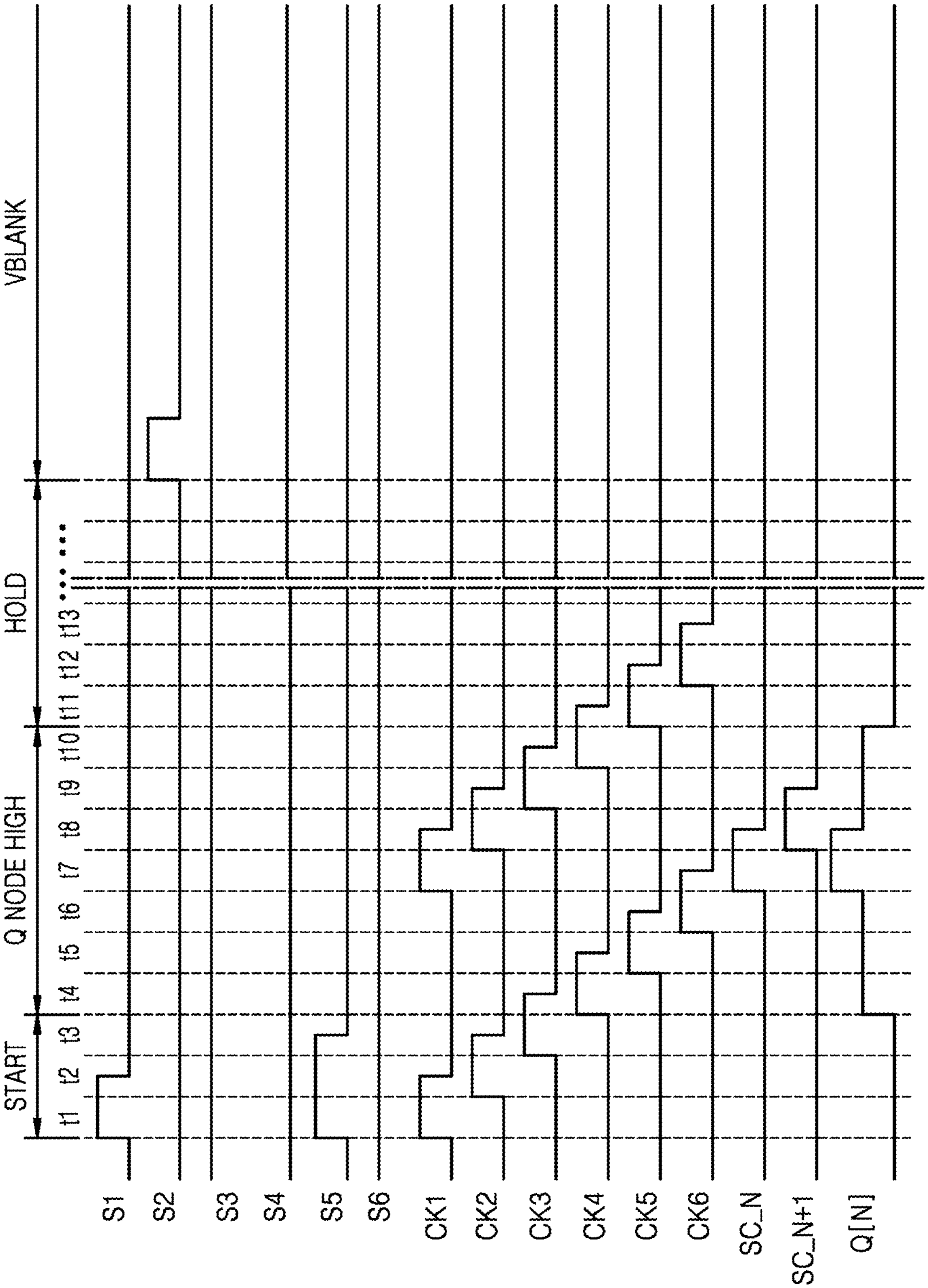
FIG. 5 is a timing diagram illustrating an input signal and an output signal of an N-th stage and an (N+1)-th stage of the scan driver of FIG. 2.

FIG. 4 is a circuit diagram of an N-th stage and an (N+1)-th stage of the scan driver of FIG. 2, and FIG. 5 is a timing diagram illustrating an input signal and an output signal of an N-th stage and an (N+1)-th stage of the scan driver of FIG. 2.

For reference, the circuit diagram of FIG. 4 is one example for convenience of description, and various circuit diagrams other than the circuit diagram of FIG. 4 may be used. The construction of transistors for controlling a pixel or controlling scan signals of a scan line may be variously changed according to the specifications of the display panel 10, the requests of a user, the environment of the supplier, and the like.

As illustrated in FIG. 4, an N-th stage ST_N and an (N+1)-th stage ST_N+1 may form a stage pair. The N-th stage ST_N and the (N+1)-th stage ST_N+1 may include switching elements directly connected to each other. In some aspects, the N-th stage ST_N and the (N+1)-th stage ST_N+1 may share at least one input signal.

First to sixth input signals S1 to S6 may be applied, an N-th clock signal may be applied, and first to third low voltages VSS1, VSS2, and VSS3 may be applied to the N-th stage ST_N. An N-th scan signal SC_N generated by the N-th stage ST_N, and an (N+1)-th scan signal SC_N+1 generated by the (N+1)-th stage ST_N+1 are illustrated in FIG. 5. For convenience of description, a scan signal mentioned in the present specification may be the N-th scan signal SC_N.

An N-th clock signal may include a gate clock signal SC-CK, a sensing clock signal SS-CK_N, and a carry clock signal CR-CK_N. An (N+1)-th clock signal may include a gate clock signal SC-CK_N+1, a sensing clock signal SS-CK_N+1, and a carry clock signal CR-CK_N+1.

As illustrated in FIG. 4, the N-th stage ST_N may include a first sensor 310, a second sensor 320, a Q node charger 330, a Q node stabilizer 340, an inverter 350, a carry signal output unit 360, a sensing signal output unit 370, a scan signal output unit 380, and a switching element stabilizer 390.

The first sensor 310 and the second sensor 320 may operate based on a first input signal S1, a second input signal S2, a sixth input signal S6, and a Q node QN signal (i.e., a signal or voltage of a Q node QN), and may sense the characteristics of a switching element inside a pixel PX of the display panel 10.

Hereinafter, an example of sensing switching elements mentioned in the present specification may be a transistor or a thin-film transistor disposed on the substrate 100.

The first sensor 310 includes a first sensing switching element T24A, a second sensing switching element T25A, and a sensing capacitor C3A.

The sensing capacitor C3A may include a first electrode and a second electrode, wherein a sixth input signal S6 is applied to the first electrode, and the second electrode is connected to a gate electrode of the first sensing switching element T24A.

The first sensing switching element T24A may include the gate electrode, a source electrode, and a drain electrode, wherein the gate electrode is connected to a second electrode of the sensing capacitor C3A, a sixth input signal S6 is applied to the source electrode, and the drain electrode is connected to a source electrode of the second sensing switching element T25A.

The second sensing switching element T25A may include a gate electrode, the source electrode, and a drain electrode, wherein a second input signal S2 is applied to the gate electrode, the source electrode is connected to the drain electrode of the first sensing switching element T24A, and the drain electrode is connected to the Q node QN.

The second sensor 320 may include a third sensing switching element T21A, a fourth sensing switching element T22A, a fifth sensing switching element T23A, a sixth sensing switching element T26A, and a seventh switching element T27A.

The third sensing switching element T21A may include a gate electrode, a source electrode, and a drain electrode, wherein a first input signal S1 is applied to the gate electrode, one (e.g., an (N−2)-th carry signal IN_N−2) of previous carry signals is applied to the source electrode, and the drain electrode is connected to a source electrode of the fourth sensing switching element T22A.

The fourth sensing switching element T22A may include a gate electrode, the source electrode, and a drain electrode, wherein the gate electrode is connected to the drain electrode of the fifth sensing switching element T23A, the source electrode is connected to a drain electrode of third sensing switching element T21A, and the drain electrode is connected to a drain electrode of a fourth sensing switching element T22B of the (N+1)-th stage ST_N+1.

The fifth sensing switching element T23A may include a gate electrode, a source electrode, and the drain electrode, wherein a first input signal S1 is applied to the gate electrode, the source electrode is connected to the drain electrode of third sensing switching element T21A, and the drain electrode is connected to a gate electrode of the fourth sensing switching element T22A.

The sixth sensing switching element T26A may include a gate electrode, a source electrode, and a drain electrode, wherein a second input signal S2 is applied to the gate electrode, the source electrode is connected to the drain electrode of the seventh switching element T27A, and the drain electrode is connected to the drain electrode of a tenth inverting switching element T18A.

The seventh switching element T27A may include a gate electrode, a source electrode, and a drain electrode, wherein the gate electrode is connected to the drain electrode of the fifth sensing switching element T23A, the first low voltage VSS1 is applied to the source electrode, and the drain electrode is connected to the source electrode of the sixth sensing switching element T26A.

The Q node charger 330 charges the Q node QN based on one of the previous carry signals. Here, one of the previous carry signals may be a carry signal (e.g., an (N−3)-th carry signal IN_N−3) of a third previous stage from a current stage.

The Q node charger 330 may include a first charge switching element T4-1A and a second charge switching element T4-2A.

The first charge switching element T4-1A may include a gate electrode, a source electrode, and a drain electrode, wherein one (e.g., an (N−3)-th carry signal IN N−3) of previous carry signals is applied to the gate electrode, one (an (N−3)-th carry signal IN N−3) of previous carry signals is applied to the source electrode, and the drain electrode is connected to the source electrode of the second charge switching element T4-2A.

The second charge switching element T4-2A may include a gate electrode, a source electrode, and a drain electrode, wherein one (e.g., an (N−3)-th carry signal IN_N−3) of previous carry signals is applied to the gate electrode, the source electrode is connected to the drain electrode of the first charge switching element T4-1A, and the drain electrode is connected to the Q node QN.

The Q node stabilizer 340 stabilizes the Q node QN based on one of next carry signals and a fifth input signal S5. Here, one of the next carry signals may be a carry signal (e.g., an (N+4)-th carry signal IN_N+4) of a fourth next stage from a current stage. As an example, the Q node stabilizer 340 of a first stage (e.g., an N-th stage ST_N) of a stage pair may receive a carry signal (e.g., an (N+4)-th carry signal IN_N+4) of a fourth next stage from a current stage. As an example, the Q node stabilizer 340 of a second stage (e.g., an (N+1)-th stage ST_N+1) of a stage pair may receive a carry signal (e.g., an (N+3)-th carry signal IN_N+3) of a third next stage from a current stage. Here, the fifth input signal S5 may be a vertical start signal.

The Q node stabilizer 340 may include a first stabilization switching element T1-1A, a second stabilization switching element T1-2A, a third stabilization switching element T2-1A, a fourth stabilization switching element T2-2A.

The first stabilization switching element T1-1A may include a gate electrode, the source electrode, and a drain electrode, wherein a fifth input signal S5 is applied to the gate electrode, the source electrode is connected to the drain electrode of the second stabilization switching element T1-2A, and the first low voltage VSS1 is applied to the drain electrode.

The second stabilization switching element T1-2A may include a gate electrode, the source electrode, and a drain electrode, wherein a fifth input signal S5 is applied to the gate electrode, the source electrode is connected to the Q node QN, and the drain electrode is connected to the source electrode of the first stabilization switching element T1-1A.

The third stabilization switching element T2-1A may include a gate electrode, a source electrode, and a drain electrode, wherein one (e.g., an (N+4)-th carry signal IN_N+4) of next carry signals is applied to the gate electrode, the source electrode is connected to the drain electrode of the fourth stabilization switching element T2-2A, and the first low voltage VSS1 is applied to the drain electrode.

The fourth stabilization switching element T2-2A may include a gate electrode, a source electrode, and a drain electrode, wherein one (e.g., an (N+4)-th carry signal IN_N+4) of next carry signals is applied to the gate electrode, the source electrode is connected to the Q node QN, and the drain electrode is connected to the source electrode of the third stabilization switching element T2-1A.

The inverter 350 may generate an inverting signal INV_N based on a third input signal S3 and a Q node QN signal. The inverter 350 may receive a signal of a Q node QN+1 of an (N+1)-th stage ST_N+1 and an inverting signal INV_N+1 of the (N+1)-th stage ST_N+1.

The inverter 350 may include a first inverting switching element T3-1A, a second inverting switching element T3-2A, a third inverting switching element T19A, a fourth inverting switching element T5-1A, a fifth inverting switching element T5-2A, a sixth inverting switching element T20A, a seventh inverting switching element T15A, an eighth inverting switching element T16A, a ninth inverting switching element T17A, and a tenth inverting switching element T18A.

The carry signal output unit 360 may output a carry signal CR_N based on a Q node QN signal and inverting signals INV_N and INV_N+1. The carry signal output unit 360 of the (N+1)-th stage ST_N+1 may output a carry signal CR_N+1.

The carry signal output unit 360 may include a first carry switching element T12A, a second carry switching element T13A, and a third carry switching element T14A.

The first carry switching element T12A may include a gate electrode, a source electrode, and a drain electrode, wherein the gate electrode is connected to the Q node QN, a carry clock signal CR-CK_N is applied to the source electrode, and the drain electrode is connected to a carry signal output terminal.

The second carry switching element T13A may include a gate electrode, a source electrode, and a drain electrode, wherein an inverting signal INV_N+1 of the (N+1)-th stage ST_N+1 is applied to the gate electrode, the source electrode is connected to a carry signal output terminal, and the first low voltage VSS1 is applied to the drain electrode.

The third carry switching element T14A may include a gate electrode, a source electrode, and a drain electrode, wherein an inverting signal INV_N is applied to the gate electrode, the source electrode is connected to a carry signal output terminal CR_N, and the first low voltage VSS1 is applied to the drain electrode.

The sensing signal output unit 370 may output a sensing signal SS_N based on a Q node QN signal and inverting signals INV_N and INV_N+1. The sensing signal output unit 370 of the (N+1)-th stage ST_N+1 may output sensing signal SS_N+1.

The sensing signal output unit 370 may include a first sensing output switching element T9A, a second sensing output switching element T10A, and a third sensing output switching element T11A.

The first sensing output switching element T9A may include a gate electrode, a source electrode, and a drain electrode, wherein the gate electrode is connected to the Q node QN, a sensing clock signal SS-CK_N is applied to the source electrode, and the drain electrode is connected to a sensing signal output terminal.

The second sensing output switching element T10A may include a gate electrode, a source electrode, and a drain electrode, wherein an inverting signal INV_N+1 of the (N+1)-th stage ST_N+1 is applied to the gate electrode, the source electrode is connected to a sensing signal output terminal, and the third low voltage VSS3 is applied to the drain electrode.

The third sensing output switching element T11A may include a gate electrode, a source electrode, and a drain electrode, wherein an inverting signal INV_N is applied to the gate electrode, the source electrode is connected to a sensing signal output terminal, and the third low voltage VSS3 is applied to the drain electrode.

The sensing signal output unit 370 may further include a sensing output capacitor C2A connected between the gate electrode and the drain electrode of the first sensing output switching element T9A.

The scan signal output unit 380 may output a scan signal SC_N based on a Q node QN signal and inverting signals INV_N and INV_N+1.

The scan signal output unit 380 may include a first gate switching element T6A, a second gate switching element T7A, and a third gate switching element T8A.

The first gate switching element T6A may include a gate electrode, a source electrode, and a drain electrode, wherein the gate electrode is connected to the Q node QN, a gate clock signal SC-CK_N is applied to the source electrode, and the drain electrode is connected to a scan signal output terminal.

The second gate switching element T7A may include a gate electrode, a source electrode, and a drain electrode, wherein an inverting signal INV_N+1 of the (N+1)-th stage ST_N+1 is applied to the gate electrode, the source electrode is connected to a scan signal output terminal, and the third low voltage VSS3 is applied to the drain electrode.

The third gate switching element T8A may include a gate electrode, a source electrode, and a drain electrode, wherein an inverting signal INV_N is applied to the gate electrode, the source electrode is connected to a scan signal output terminal, and the third low voltage VSS3 is applied to the drain electrode.

The scan signal output unit 380 may further include a gate capacitor C1A connected between the gate electrode and the drain electrode of the first gate switching element T6A.

The switching element stabilizer 390 transfers a sixth input signal S6 to an intermediate node of a serially connected switching element in response to the Q node QN to stabilize the operation of the serially connected switching element.

The switching element stabilizer 390 may include a switching element stabilization switching element T28A.

The switching element stabilization switching element T28A may include a gate electrode, a source electrode, and a drain electrode, wherein the gate electrode is connected to the Q node QN, a sixth input signal S6 is applied to the source electrode, and the drain electrode is connected to a drain electrode of the first charge switching element T4-1A. The drain electrode of the switching element stabilization switching element T28A may be commonly connected to a node to which the first charge switching element T4-1A and the second charge switching element T4-2A are connected, a node to which the first stabilization switching element T1-1A and the second stabilization switching element T1-2A are connected, a node to which the third stabilization switching element T2-1A and the fourth stabilization switching element T2-2A are connected, a node to which the first inverting switching element T3-1A and the second inverting switching element T3-2A are connected, and a node to which the fourth inverting switching element T5-1A and the fifth inverting switching element T5-2A are connected.

The N-th stage ST_N and the (N+1)-th stage ST_N+1 illustrated in FIG. 4 may form a stage pair, and as illustrated, the (N+1)-th stage ST_N+1 may include a circuit in a mirrored form with the N-th stage ST_N. In FIG. 4, the reference numerals ending with "B" are used to represent the elements in the (N+1)-th stage ST_N+1 that correspond to the elements in the Nth stage ST-N, and their repeated descriptions will be omitted herein.

When a third input signal S3 is input to the N-th stage ST_N, a fourth input signal S4 may be input to a construction corresponding to the (N+1)-th stage ST_N+1.

In some aspects, a carry signal (e.g., an (N+4)-th carry signal IN_N+4) of a fourth next stage from a current stage (e.g., an N-th stage ST_N) may be applied to a third stabilization switching element T2-1A and a fourth stabilization switching element T2-2A of a Q node stabilizer 240 of the N-th stage ST_N, while a carry signal (e.g., an (N+3)-th carry signal IN_N+3) of a third next stage from a current stage (e.g., an (N+1)-th stage ST_N+1) may be applied to a third stabilization switching element T2-1B and a fourth stabilization switching element T2-2B of a Q node stabilizer 240 of the (N+1)-th stage ST_N+1.

As illustrated in FIG. 5, a third input signal S3 may have a high level, and a fourth input signal S4 may have a low level. However, depending on cases, a third input signal S3 and a fourth input signal S4 may be inverted on a frame basis. In the case where a third input signal S3 and a fourth input signal S4 are inverted, a third input signal S3 may have a low level, and a fourth input signal S4 may have a high level in the next frame.

Referring to FIGS. 3 and 5, six clock signals CK1 to CK6 having different phases may be sequentially applied to stages of the scan driver GP.

As an example, a first clock signal CK1 may be applied to a first stage ST1, a second clock signal CK2 may be applied to a second stage ST2, a third clock signal CK3 may be applied to a third stage ST3, a fourth clock signal CK4 may be applied to a fourth stage ST4, a fifth clock signal CK5 may be applied to a fifth stage ST5, a sixth clock signal CK6 may be applied to a sixth stage ST6, a first clock signal CK1 may be applied to a seventh stage ST7, a second clock signal CK2 may be applied to an eighth stage ST8, a third clock signal CK3 may be applied to a ninth stage ST9, a fourth clock signal CK4 may be applied to a tenth stage ST10, a fifth clock signal CK5 may be applied to an eleventh stage ST11 (not illustrated), and a sixth clock signal CK6 may be applied to a twelfth stage ST12 (not illustrated).

Referring to FIG. 5, the N-th stage ST_N may operate based on a first clock signal CK1. First to third horizontal periods t1 to t3 are start sections, fourth to tenth horizontal periods t4 to t10 are Q node high sections in which a Q node QN signal has a high level, a seventh horizontal period t7 is a gate output section in which a scan signal SC_N is output, and eleventh to vertical blank periods t11 to VBLANK are holding sections. The vertical blank period VBLANK starts from a point where the second input signal S2 has a high level, and during the blank period VBLANK, the first and second sensors 310 and 320 may sense the characteristics of the switching element included in a pixel PX.

Figure 6:
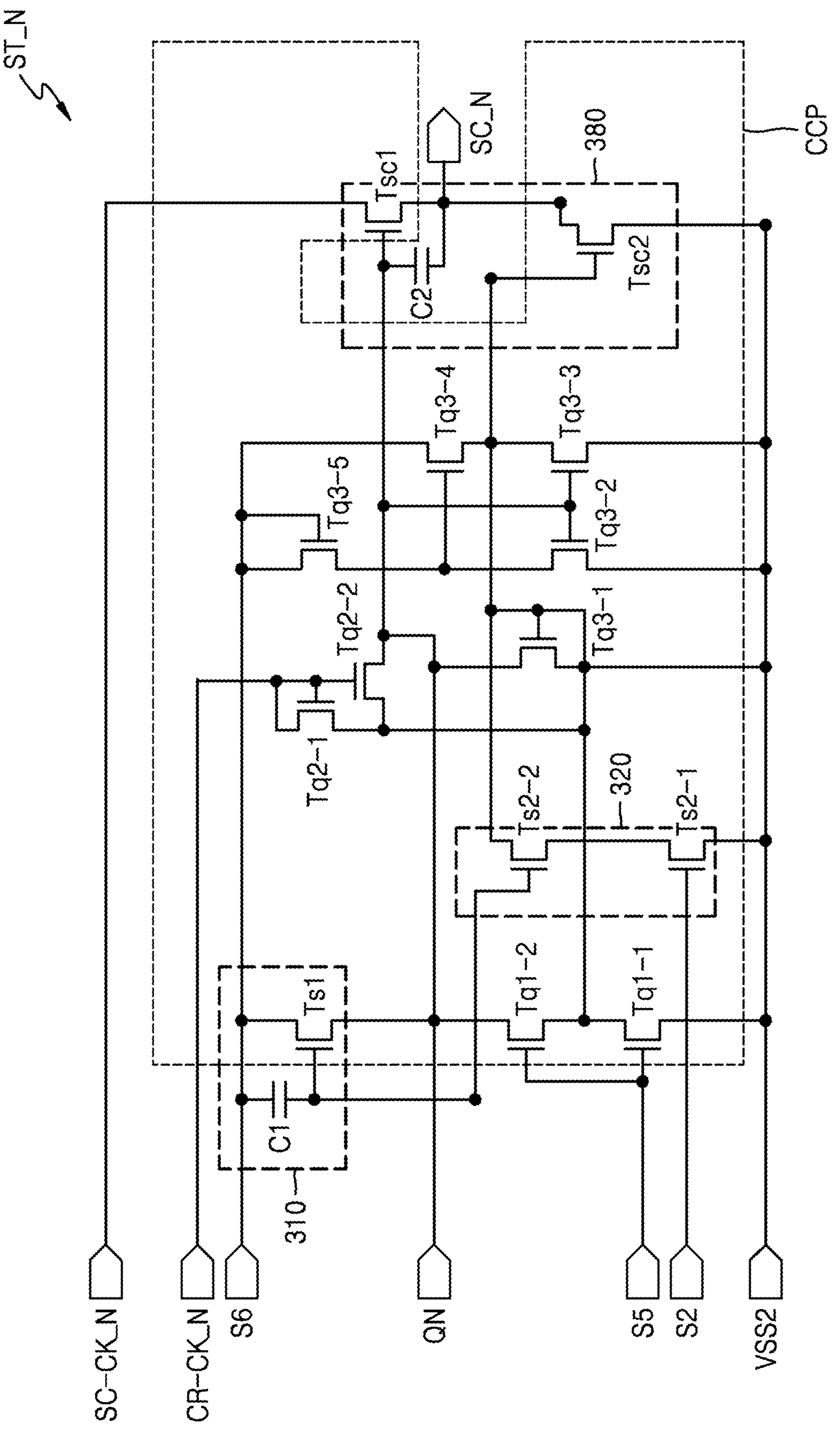
FIG. 6 is a view illustrating an example of a circuit diagram illustrating some elements for outputting a scan signal among an N-th stage of the scan driver of FIG. 2.

FIG. 6 is a view illustrating an example of a circuit diagram illustrating some elements for outputting a scan signal among an N-th stage of the scan driver of FIG. 2.

For reference, the circuit diagram of FIG. 6 is an example for convenience of description and may be a circuit diagram in which some elements associated with outputting a scan signal SC_N are excerpted for convenience of description. In the descriptions of FIG. 6, content that is identical or overlapping content of FIGS. 4 and 5 may be omitted.

For reference, elements of the circuit diagram of FIG. 6 may be elements corresponding to the elements of the circuit diagram of FIG. 4, and elements partially different from the elements of the circuit diagram of FIG. 4, or coupling between elements partially different from the coupling between elements of the circuit diagram of FIG. 4 may be included. However, the circuit diagram of FIG. 6 is an example for convenience of description, and elements of the circuit diagram of FIG. 6 may be variously changed according to the specifications of the display panel 10, the requests of a user, the environment of the supplier, and the like.

The circuit diagram of FIG. 6 is a portion of the elements configuring the N-th stage ST_N and may include a first capacitor C1, a second capacitor C2, and a transistor part CCP.

The first capacitor C1 is an element corresponding to the sensing capacitor C3A of FIG. 4, and description of the first capacitor C1 may be replaced with the description of the sensing capacitor C3A of FIG. 4.

The second capacitor C2 is an element corresponding to the gate capacitor C1A of FIG. 4, and description of the second capacitor C2 may be replaced with the description of the gate capacitor C1A of FIG. 4.

The transistor part CCP may include elements other than the first capacitor C1 and the second capacitor C2 among the elements of FIG. 6. As an example, the transistor part CCP may be defined as an element including switching elements (e.g., a thin-film transistor) among some elements for outputting a scan signal SC_N in the N-th stage ST_N of the scan driver GP.

The circuit of FIG. 6 may include the first sensor 310, and the first sensor 310 may include the first capacitor C1 and a first sensing transistor Ts1.

The first sensing transistor Ts1 may be an element corresponding to the first sensing switching element T24A of FIG. 4. Description of the first sensing transistor Ts1 may be replaced with the description of the first sensing switching element T24A of FIG. 4.

As an example, a first electrode of the first capacitor C1 may be electrically connected to a terminal receiving a sixth input signal S6. A second electrode of the first capacitor C1 may be electrically connected to a gate electrode of the first sensing transistor Ts1. The terminal receiving a sixth input signal S6 may be electrically connected to a source electrode of the first sensing transistor Ts1.

As an example, the circuit of FIG. 6 may include the second sensor 320, and the second sensor 320 may include a second-1 sensing transistor Ts2-1 electrically connected to a terminal receiving a second input signal S2. A gate electrode of the second-1 sensing transistor Ts2-1 may be electrically connected to the terminal receiving a second input signal S2. A drain electrode of the second-1 sensing transistor Ts2-1 may be electrically connected to a terminal to which the first low voltage VSS1 is applied.

As an example, the second sensor 320 may include a second-2 sensing transistor Ts2-2 electrically connected to the second-1 sensing transistor Ts2-1. A source electrode of the second-1 sensing transistor Ts2-1 may be electrically connected to a drain electrode of the second-2 sensing transistor Ts2-2. A gate electrode of the second-2 sensing transistor Ts2-2 may be electrically connected to the second electrode of the first capacitor C1 and may be electrically connected to the gate electrode of the first sensing transistor Ts1.

As an example, the circuit of FIG. 6 may include the scan signal output unit 380, and the scan signal output unit 380 may include the second capacitor C2, a first output transistor Tsc1, and a second output transistor Tsc2.

A first electrode of the second capacitor C2 may be electrically connected to a gate electrode of the first output transistor Tsc1. The first electrode of the second capacitor C2 may be also electrically connected to the Q node QN. A second electrode of the second capacitor C2 may be electrically connected to a drain electrode of the first output transistor Tsc1. The drain electrode of the first output transistor Tsc1 may be also electrically connected to an output terminal from which a scan signal SC_N is output. The drain electrode of the first output transistor Tsc1 may be also electrically connected to a source electrode of the second output transistor Tsc2. A drain electrode of the second output transistor Tsc2 may be electrically connected to a terminal to which the first low voltage VSS1 is transferred. As an example, the first low voltage VSS1 may be a ground voltage. Depending on cases, the first low voltage VSS1 may be replaced with the second low voltage VSS2.

The circuit of FIG. 6 may further include a plurality of switching elements (transistors). As an example, the circuit of FIG. 6 may further include a first-1 node transistor Tq1-1 to a third-5 node transistor Tq3-5. The circuit of FIG. 6 may include node transistors corresponding to switching elements included in the Q node charger 330 and the Q node stabilizer 340 of FIG. 4.

As an example, a terminal transferring a fifth input signal S5 may be electrically connected to a gate electrode of the first-1 node transistor Tq1-1 and a gate electrode of the first-2 node transistor Tq1-2. A drain electrode of the first-1 node transistor Tq1-1 may be electrically connected to a terminal to which the second low voltage VSS2 is transferred, and a source electrode of the first-1 node transistor Tq1-1 may be electrically connected to a drain electrode of the first-2 node transistor Tq1-2. A source electrode of the first-2 node transistor Tq1-2 may be electrically connected to the Q node QN. As an example, the first-1 node transistor Tq1-1 and the first-2 node transistor Tq1-2 may correspond to switching elements included in the Q node stabilizer 340 of FIG. 4.

As an example, a second-1 node transistor Tq2-1 may be electrically connected to a second-2 node transistor Tq2-2, and a source electrode and a gate electrode of the second-1 node transistor Tq2-1 may be electrically connected to a terminal to which a carry clock signal CR-CK_N is transferred. A gate electrode of the second-1 node transistor Tq2-1 may be electrically connected to a gate electrode of the second-2 node transistor Tq2-2. A drain electrode of the second-1 node transistor Tq2-1 may be electrically connected to a source electrode of the second-2 node transistor Tq2-2. As an example, the second-1 node transistor Tq2-1 and the second-2 node transistor Tq2-2 may correspond to switching elements included in the Q node stabilizer 340 of FIG. 4.

As an example, a third-1 node transistor Tq3-1 may be electrically connected to the Q node QN. A source electrode of the third-1 node transistor Tq3-1 may be electrically connected to the Q node QN, and a gate electrode of the third-1 node transistor Tq3-1 may be electrically connected to a source electrode of the second-2 sensing transistor. A drain electrode of the third-1 node transistor Tq3-1 may be electrically connected to a terminal to which the second low voltage VSS2 is transferred.

As an example, a third-2 node transistor Tq3-2 may be electrically connected to the Q node QN. A source electrode of the third-2 node transistor Tq3-2 may be electrically connected to a drain electrode of a third-5 node transistor Tq3-5, and a drain electrode of the third-2 node transistor Tq3-2 may be electrically connected to a terminal to which the second low voltage VSS2 is transferred. A gate electrode of the third-2 node transistor Tq3-2 may be electrically connected to a third-3 node transistor Tq3-3 and the Q node QN.

As an example, the third-3 node transistor Tq3-3 may be electrically connected to the Q node QN, the third-2 node transistor Tq3-2, and a third-4 node transistor Tq3-4. A source electrode of the third-3 node transistor Tq3-3 may be electrically connected to a drain electrode of the third-4 node transistor Tq3-4, and a gate electrode of the third-3 node transistor Tq3-3 may be electrically connected to a gate electrode of the third-2 node transistor Tq3-2, and the Q node QN.

As an example, the third-4 node transistor Tq3-4 may be electrically connected to the third-2 node transistor Tq3-2, the third-3 node transistor Tq3-3, and the third-5 node transistor Tq3-5. A source electrode of the third-4 node transistor Tq3-4 may be electrically connected to a source electrode of the third-5 node transistor Tq3-5 and a gate electrode of the third-5 node transistor Tq3-5. A source electrode of the third-4 node transistor Tq3-4 may be electrically connected to a terminal to which a sixth input signal S6 is transferred. A gate electrode of the third-4 node transistor Tq3-4 may be electrically connected to a drain electrode of the third-5 node transistor Tq3-5 and a source electrode of the third-2 node transistor Tq3-2. A drain electrode of the third-4 node transistor Tq3-4 may be electrically connected to a source electrode of the third-3 node transistor Tq3-3.

As an example, the third-5 node transistor Tq3-5 may be electrically connected to a terminal to which a sixth input signal S6 is transferred, the third-2 node transistor Tq3-2, and a third-4 node transistor Tq3-4. A source electrode of the third-5 node transistor Tq3-5 may be electrically connected to a gate electrode of the third-5 node transistor Tq3-5 and the Q node QN, and may be electrically connected to a source electrode of the third-4 node transistor Tq3-4. A drain electrode of the third-5 node transistor Tq3-5 may be electrically connected to a gate electrode of the third-4 node transistor Tq3-4 and a source electrode of the third-2 node transistor Tq3-2.

Figure 7:
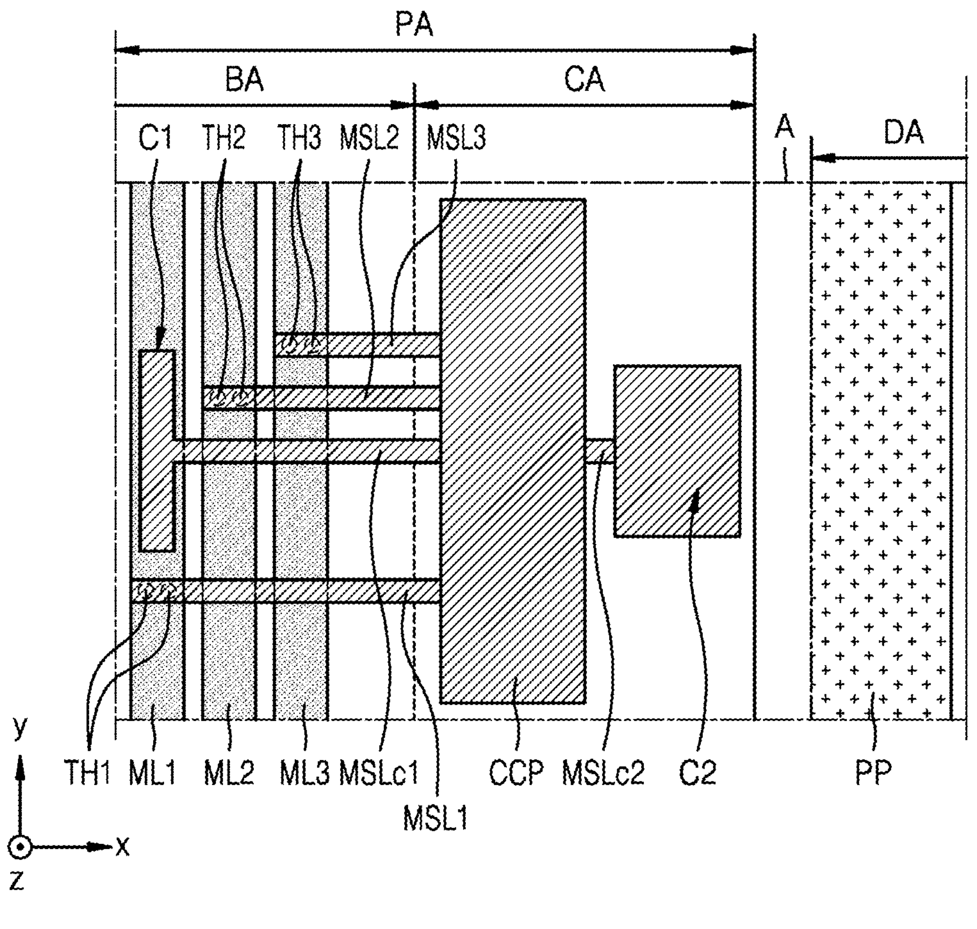
FIG. 7 is a schematic plan view illustrating an example of a region A of FIG. 1.

FIG. 7 is a schematic plan view illustrating an example of a region A of FIG. 1.

For reference, the region A may include a portion of the display area DA and a portion of the peripheral area PA. For convenience of description, an example of a portion of the display panel is mainly described in the present specification, and only a portion of the region A may be described.

As illustrated in FIG. 7, the display apparatus according to an embodiment may include the display area DA and the peripheral area PA. For description of the display area DA and the peripheral area PA, it may be described in the present specification that a substrate included in the display apparatus includes the display area DA and the peripheral area PA disposed surrounding the display area DA.

The pixels may be disposed in the display area DA. The peripheral area PA may include a wiring arrangement area BA and a circuit arrangement area CA in which the transistor part CCP are disposed, wherein wirings are disposed in the wiring arrangement area BA, and the transistor part CCP includes at least one transistor.

In a plan view, the circuit arrangement area CA may be disposed between the display area DA and the wiring arrangement area BA. As an example, the wiring arrangement area BA may be disposed along the edge of the display area DA, and the wiring arrangement area BA may be disposed along the outer edge of the circuit arrangement area CA.

As an example, a circuit disposed in the circuit arrangement area CA may be an oxide thin-film transistor (TFT) gate driver circuit for generating or controlling scan signals transferred to pixels. As an example, a circuit disposed in the circuit arrangement area CA may be a circuit having the circuit diagram of FIG. 4 or the circuit diagram of FIG. 6.

As an example, wirings ML1 to ML3 disposed in the wiring arrangement area BA may extend in one direction. In the region A, wirings may extend in a y axis direction. The wirings disposed in the wiring arrangement area BA may extend in a direction in which the edge of the display area DA extends or the y axis direction.

Accordingly, in a region of the peripheral area PA other than the region A, the wirings may extend in a direction crossing the direction in which the edge of the display area DA extends, or an x axis direction. The wirings disposed in the wiring arrangement area BA may include the wiring ML1 (referred to as a first wiring, hereinafter) to which a sixth input signal S6 is transferred.

The first capacitor C1 of FIG. 7 may be the first capacitor C1 of FIG. 6 or the sensing capacitor C3A of FIG. 4. Because the first capacitor C1 of FIG. 6 is a concept corresponding to the sensing capacitor C3A of FIG. 4, for convenience of description, the first capacitor C1 of FIG. 7 is described as being equal to the first capacitor C1 of FIG. 6, and it would be obviously understood by those of ordinary skill in the art that the first capacitor C1 of FIG. 7 is the sensing capacitor C3A of FIG. 4.

The second capacitor C2 of FIG. 7 may be the second capacitor C2 of FIG. 6 or the gate capacitor C1A of FIG. 4. Because the second capacitor C2 of FIG. 6 is a concept corresponding to the gate capacitor C1A of FIG. 4, for convenience of description, the second capacitor C2 of FIG. 7 is described as being equal to the second capacitor C2 of FIG. 6, and it would be obviously understood by those of ordinary skill in the art that the second capacitor C2 of FIG. 7 is the gate capacitor C1A of FIG. 4.

The transistor part CCP may be disposed in the circuit arrangement area CA. In a plan view, the transistor part CCP may be disposed between the first capacitor C1 and the second capacitor C2. The transistor part CCP may include a plurality of transistors, and the plurality of transistors may configure a circuit for the scan driver GP. The plurality of transistors may be variously disposed according to each function and role. Although an example of the transistors configuring the transistor part CCP may be disposed according to the circuit diagram of FIG. 4 or the circuit diagram of FIG. 6, this is just an example to help understanding, and an embodiment is not limited thereto.

As illustrated in FIG. 7, the first capacitor C1 may be disposed in the wiring arrangement area BA, not the circuit arrangement area CA, and the transistor part CCP may be arranged in the circuit arrangement area CA. As a result, it may be obviously understood that the first sensing switching element T24A of FIG. 4 or the first sensing transistor Ts1 of FIG. 6 included in the transistor part CCP is disposed in the circuit arrangement area CA.

The transistor part CCP and the first capacitor C1 may be apart from each other in a plan view. The transistor part CCP and the first capacitor C1 may be positioned at physically separated locations, respectively. As a result, the first sensing switching element T24A of FIG. 4 or the first sensing transistor Ts1 of FIG. 6 included in the transistor part CCP may be apart from the first capacitor C1 in a plan view.

The first capacitor C1 may further include a first upper electrode and a first lower electrode vertically apart from the first upper electrode (e.g., apart from a first upper electrode in a third direction (z axis direction)). A first insulating layer (not illustrated) may be disposed between the first upper electrode and the first lower electrode. The first insulating layer (not illustrated) may include a dielectric that insulates between the first upper electrode and the first lower electrode.

The first upper electrode of the first capacitor C1 may be a second electrode of the sensing capacitor C3A. The first lower electrode of the first capacitor C1 may be a first electrode of the sensing capacitor C3A. That is, the first electrode and the second electrode of the sensing capacitor C3A may vertically overlap each other, and the first electrode may be disposed below the second electrode.

As an example, a portion of a first wiring ML1 may be vertically apart from the second electrode.

As illustrated in FIG. 7, one of the electrodes of the first capacitor C1 may be the first wiring ML1 transferring a sixth input signal S6, or a portion of the first wiring ML1. The other of the electrodes of the first capacitor C1 may be a metal electrode disposed to overlap the first wiring ML1 in a plan view.

As an example, the first upper electrode of the first capacitor C1 may be a metal electrode disposed to overlap the first wiring ML1 in a plan view, and the first lower electrode of the first capacitor C1 may be the first wiring ML1 transferring a sixth input signal S6, or a portion of the first wiring ML1.

As an example, the second electrode of the first capacitor C1 may include a first portion (e.g., the metal electrode) overlapping the first wiring ML1 in a plan view. The second electrode of the first capacitor C1 may further include a second portion connecting the first portion to a gate electrode of the sensing transistor, and the second portion may be connected to a first cap sub-wiring MSLc1.

As an example, the first portion may extend in a direction in which the first wiring ML1 extends, and the second portion may extend in a direction crossing the direction in which the first wiring ML1 extends.

As an example, a width of the first portion (e.g., a width in a direction in which the second portion extends, or a width in the x axis direction) may be greater than a width of the second portion (e.g., a width in a direction in which the first portion extends, or a width in the y axis direction).

As an example, one (e.g., the first electrode) of the electrodes of the first capacitor C1 may be at least a portion of a wiring transferring a scan input voltage depending on cases. The other (e.g., the second electrode) of the electrodes of the first capacitor C1 may be a metal electrode disposed to overlap the wiring transferring a scan input voltage in a plan view. The scan input voltage may denote a voltage which drives the scan driver. The scan input voltage may be generated by a power module 1500 (see FIG. 13) described herein and be applied under control of a controller 1120-1 (see FIG. 13) described herein.

A first cap sub-wiring MSLc1 may include a conductive material. The first cap sub-wiring MSLc1 may be electrically connected to the first upper electrode or the second electrode of the first capacitor C1. The first cap sub-wiring MSLc1 may electrically connect the transistor part CCP to the first upper electrode or the second electrode of the first capacitor C1.

The first cap sub-wiring MSLc1 may cross the first wiring ML1 to the third wiring ML3 in a plan view. The first cap sub-wiring MSLc1 may be disposed on the first wiring ML1 to the third wiring ML3. The first cap sub-wiring MSLc1 may extend in a direction crossing the direction in which the first wiring ML1 extends. As an example, in the region A (see FIG. 1), the first cap sub-wiring MSLc1 may extend in the x axis direction.

The second capacitor C2 may be disposed in the peripheral area PA, and particularly, disposed in the circuit arrangement area CA. In a plan view, the transistor part CCP may be disposed between the second capacitor C2 and the first capacitor C1. In a plan view, the second capacitor C2 and the transistor part CCP may be disposed between the first capacitor C1 and the display area DA. In a plan view, the first capacitor C1 may be disposed further away from the display area DA than the second capacitor C2 and the transistor part CCP.

The second capacitor C2 may include a second upper electrode and a second lower electrode vertically apart from the second upper electrode. A second insulating layer (not illustrated) may be disposed between the second upper electrode and the second lower electrode. The second insulating layer (not illustrated) may include a dielectric that insulates between the second upper electrode and the second lower electrode.

A second cap sub-wiring MSLc2 may include a conductive material. The second cap sub-wiring MSLc2 may be electrically connected to the second capacitor C2. The second cap sub-wiring MSLc2 may electrically connect the transistor part CCP to the second capacitor C2.

The second cap sub-wiring MSLc2 may extend in a direction crossing the direction in which the first wiring ML1 extends. As an example, in the region A (see FIG. 1), the second cap sub-wiring MSLc2 may extend in the x axis direction.

The first wiring ML1 may include a conductive material. The first wiring ML1 may be disposed below the first sub-wiring MSL1 described herein. In a plan view, a direction in which the first wiring ML1 extends may cross a direction in which the first sub-wiring MSL1 extends. As an example, in the region A, the first wiring ML1 may extend in the y axis direction. In a cross-sectional view, at least one different layer may be disposed between the first wiring ML1 and the first sub-wiring MSL1.

A first through hole TH1 may be formed in the at least one different layer between the first wiring ML1 and the first sub-wiring MSL1. The first wiring ML1 may be electrically connected to the first sub-wiring MSL1 through the first through hole TH1.

The first sub-wiring MSL1 may include a conductive material. The first sub-wiring MSL1 may electrically connect the first wiring ML1 to the transistor part CCP.

The first sub-wiring MSL1 may extend in a direction crossing the direction in which the first wiring ML1 extends. As an example, in the region A, the first sub-wiring MSL1 may extend in the x axis direction. The first sub-wiring MSL1 and the first cap sub-wiring MSLc1 may be disposed approximately in parallel to each other in a plan view.

A second wiring ML2 may be disposed around (adjacent and parallel to) the first wiring ML1 in a plan view. The second wiring ML2 may transfer another input signal (e.g., one of a first input signal S1 to a fifth input signal S5) other than a sixth input signal S6. To transfer a different input signal, the second wiring ML2 may be electrically connected to the controller CP of FIG. 2.

The second wiring ML2 may include a conductive material. The second wiring ML2 may be disposed below a second sub-wiring MSL2 described herein. In a plan view, a direction in which the second wiring ML2 extends may cross a direction in which the second sub-wiring MSL2 extends. As an example, in the region A, the second wiring ML2 may extend in the y axis direction. In a cross-sectional view, at least one different layer may be disposed between the second wiring ML2 and the second sub-wiring MSL2.

A second through hole TH2 may be formed in the at least one different layer between the second wiring ML2 and the second sub-wiring MSL2. The second wiring ML2 may be electrically connected to the second sub-wiring MSL2 through the second through hole TH2. The second wiring ML2 may be in direct contact with the second sub-wiring MSL2 in a direction perpendicular to the substrate 100 (or the third direction or x axis direction) through the second through hole TH2.

The second sub-wiring MSL2 may include a conductive material. The second sub-wiring MSL2 may may be electrically connected to the second wiring ML2 through the second through hole TH2. The second sub-wiring MSL2 may electrically connect the second wiring ML2 to the transistor part CCP.

The second sub-wiring MSL2 may extend in a direction crossing the direction in which the second wiring ML2 extends. As an example, in the region A, the second sub-wiring MSL2 may extend in the x axis direction. The second sub-wiring MSL2 and the second cap sub-wiring MSLc2 may be disposed approximately in parallel to each other in a plan view.

A third wiring ML3 may be disposed around (adjacent and parallel to) the second wiring ML2 in a plan view. In a plan view, the second wiring ML2 may be disposed between the first wiring ML1 and the third wiring ML3. The third wiring ML3 may transfer another input signal (e.g., one of a first input signal S1 to a fifth input signal S5) other than a sixth input signal S6. To transfer a different input signal, the third wiring ML3 may be electrically connected to the controller CP of FIG. 2.

The third wiring ML3 may include a conductive material. The third wiring ML3 may be disposed below a third sub-wiring MSL3 described herein. In a plan view, a direction in which the third wiring ML3 extends may cross a direction in which the third sub-wiring MSL3 extends. As an example, in the region A, the third wiring ML3 may extend in the y axis direction. As an example, the first wiring ML1 to the third wiring ML3 may be disposed in parallel to each other in a plan view of the region A. In a cross-sectional view, at least one different layer may be disposed between the third wiring ML3 and the third sub-wiring MSL3.

A third through hole TH3 may be formed in the at least one different layer between the third wiring ML3 and the third sub-wiring MSL3. The third wiring ML3 may be electrically connected to the third sub-wiring MSL3 through the third through hole TH3. The third wiring ML3 may be in direct contact with the third sub-wiring MSL3 in a direction perpendicular to the substrate 100 through the third through hole TH3.

Although, for convenience of description, the first wiring ML1 to the third wiring ML3, and the first sub-wiring MSL1 to the third sub-wiring MSL3 are described, and additional wirings may be further disposed as applicable or suitable in association with functionality of the display apparatus.

Referring to FIGS. 1, 2, 4, 6, and 7, the scan driver GP may be disposed in the peripheral area PA and be electrically connected to the pixel PX (or a pixel circuit including elements forming the pixel) of the pixel part PP. The scan driver GP may include the sensing transistor Ts1 (see FIG. 6), the first wiring ML1 (or an input terminal (e.g., an input terminal for transferring a sixth input signal S6) electrically connected to the source electrode of the sensing transistor Ts1, and the sensing capacitor C3A of FIG. 4 (or the first capacitor C1 of FIG. 6) electrically connected to the source electrode of the sensing transistor Ts1 and the gate electrode of the sensing transistor Ts1.

The controller CP may transfer control signals to the pixel PX (or the pixel circuit) and the scan driver GP, respectively. Control signals transferred by the controller CP may denote the above-described input signals (e.g., the gate driving control signal GCS of FIG. 2, the input signals S1 to S6 and the like of FIG. 4).

The sensing capacitor C3A of FIG. 4 or the first capacitor C1 of FIG. 6 may be disposed in the wiring arrangement area BA, and the sensing transistor Ts1 may be disposed in the circuit arrangement area CA. Because the sensing transistor Ts1 is an element included in the transistor part CCP, it may be obviously understood that the sensing transistor Ts1 is disposed in the circuit arrangement area CA.

As an example, the first wiring ML1 may be electrically connected to the controller CP, and may receive a control signal from the controller CP to transfer the control signal to the sensing transistor Ts1.

As an example, a portion of the first wiring ML1 may overlap the second electrode of the first capacitor C1 in a plan view. As an example, an insulating layer (not illustrated) may be disposed between the first electrode and the second electrode of the first capacitor C1, and the insulating layer (not illustrated) may include an insulating material.

As an example, in a plan view, the first capacitor C1 may be apart from the sensing transistor Ts1 in the first direction (e.g., the x axis direction in FIG. 7). As an example, the first wiring ML1 may extend in the second direction (e.g., the y axis direction in FIG. 7) crossing the first direction (the x axis direction). Crossing of two directions may denote crossing observed in a plan view.

Figure 8:
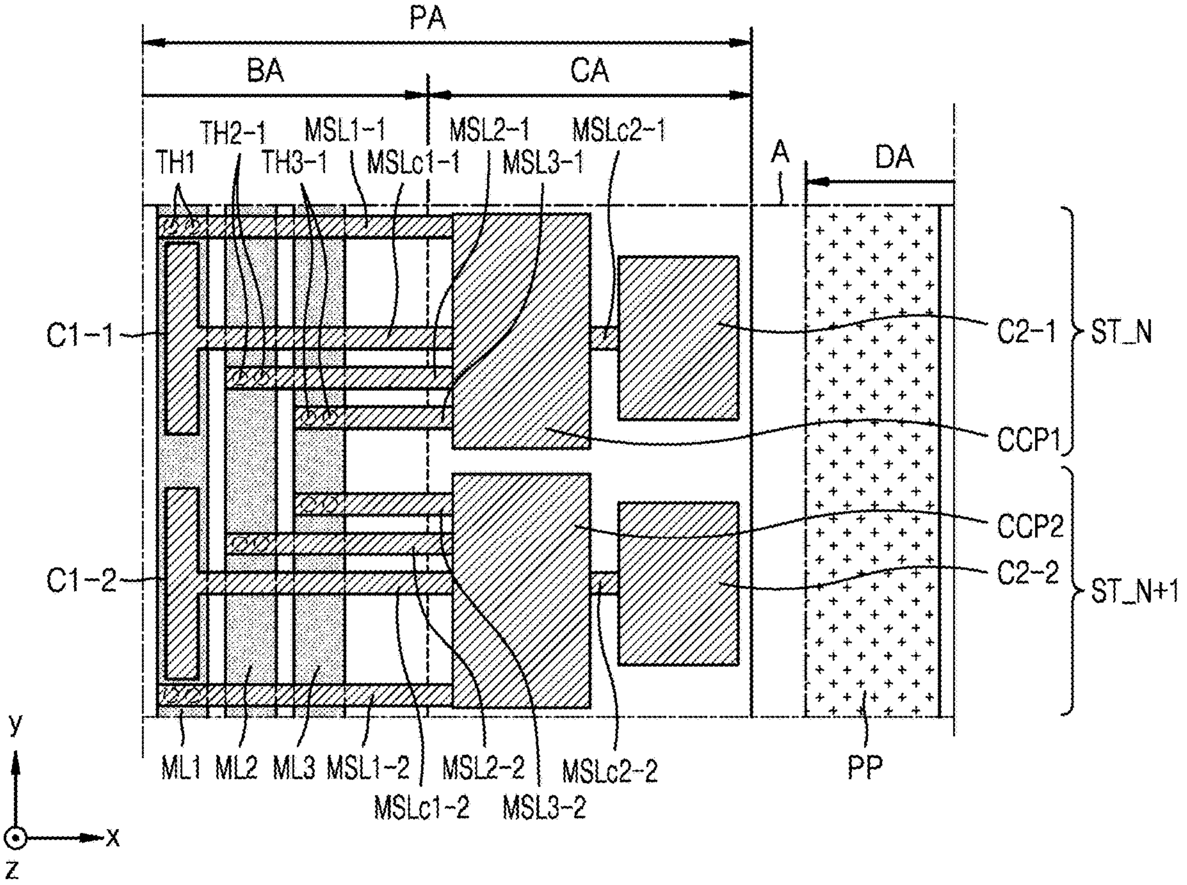
FIG. 8 is a schematic plan view illustrating an example of the region A of FIG. 1.

FIG. 8 is a schematic plan view illustrating an example of the region A of FIG. 1.

As illustrated in FIG. 8, a first transistor part CCP1, a first-1 capacitor C1-1, a second-1 capacitor C2-1, a first-1 cap sub-wiring MSLc1-1, a first-1 sub-wiring MSL1-1, a second-1 sub-wiring MSL2-1, and a third-1 sub-wiring MSL3-1 corresponding to the N-th stage ST_N are disclosed. For convenience of description, only some elements are illustrated, and additional elements may be further disposed as applicable or suitable in association with functionality of the display apparatus.

The first transistor part CCP1 may be an element corresponding to the transistor part CCP of FIG. 7. The first transistor part CCP1 of the N-th stage ST_N may be an element performing the same role as a role of the transistor part CCP of FIG. 7.

The first-1 capacitor C1-1 may be an element corresponding to the first capacitor C1 of FIG. 7. The first-1 capacitor C1-1 of the N-th stage ST_N may be an element performing the same role as a role of the first capacitor C1 of FIG. 7.

The second-1 capacitor C2-1 may be an element corresponding to the second capacitor C2 of FIG. 7. The second-1 capacitor C2-1 of the N-th stage ST_N may be an element performing the same role as a role of the second capacitor C2 of FIG. 7.

The first-1 cap sub-wiring MSLc1-1, the first-1 sub-wiring MSL1-1, the second-1 sub-wiring MSL2-1, and the third-1 sub-wiring MSL3-1 may be elements corresponding to the first cap sub-wiring MSLc1, the first sub-wiring MSL1, the second sub-wiring MSL2, and the third sub-wiring MSL3 of FIG. 7. The first-1 cap sub-wiring MSLc1-1, the first-1 sub-wiring MSL1-1, the second-1 sub-wiring MSL2-1, and the third-1 sub-wiring MSL3-1 of the N-th stage ST_N may be elements performing the same roles as roles of the first cap sub-wiring MSLc1, the first sub-wiring MSL1, the second sub-wiring MSL2, and the third sub-wiring MSL3 of FIG. 7.

Accordingly, descriptions of the first transistor part CCP1, the first-1 capacitor C1-1, the second-1 capacitor C2-1, the first-1 cap sub-wiring MSLc1-1, the first-1 sub-wiring MSL1-1, the second-1 sub-wiring MSL2-1, and the third-1 sub-wiring MSL3-1 corresponding to the N-th stage ST_N may be replaced with the descriptions of FIG. 7.

As illustrated in FIG. 8, a second transistor part CCP2, a first-2 capacitor C1-2, a second-2 capacitor C2-2, a first-2 cap sub-wiring MSLc1-2, a first-2 sub wiring MSL1-2, a second-2 sub wiring MSL2-2, and a third-2 sub wiring MSL3-2 corresponding to the (N+1)-th stage ST_N+1 are disclosed. For convenience of description, only some elements are illustrated, and additional elements may be further disposed as applicable or suitable in association with functionality of the display apparatus.

The second transistor part CCP2 may be an element corresponding to the transistor part CCP of FIG. 7. The second transistor part CCP2 of the (N+1)-th stage ST_N+1 may be an element performing the same role as a role of the transistor part CCP of FIG. 7.

The first-2 capacitor C1-2 may be an element corresponding to the first capacitor C1 of FIG. 7. The first-2 capacitor C1-2 of the (N+1)-th stage ST_N+1 may be an element performing the same role as a role of the first capacitor C1 of FIG. 7.

The second-2 capacitor C2-2 may be an element corresponding to the second capacitor C2 of FIG. 7. The second-2 capacitor C2-2 of the (N+1)-th stage ST_N+1 may be an element performing the same role as a role of the second capacitor C2 of FIG. 7.

The first-2 cap sub-wiring MSLc1-2, the first-2 sub-wiring MSL1-2, the second-2 sub-wiring MSL2-2, and the third-2 sub-wiring MSL3-2 may be elements corresponding to the first cap sub-wiring MSLc1, the first sub-wiring MSL1, the second sub-wiring MSL2, and the third sub-wiring MSL3 of FIG. 7.

The first-2 cap sub-wiring MSLc1-2, the first-2 sub-wiring MSL1-2, the second-2 sub-wiring MSL2-2, and the third-2 sub-wiring MSL3-2 of the (N+1)-th stage ST_N+1 may be elements performing the same roles as roles of the first cap sub-wiring MSLc1, the first sub-wiring MSL1, the second sub-wiring MSL2, and the third sub-wiring MSL3 of FIG. 7.

Accordingly, descriptions of the second transistor part CCP2, the first-2 capacitor C1-2, the second-2 capacitor C2-2, the first-2 cap sub-wiring MSLc1-2, the first-2 sub-wiring MSL1-2, the second-2 sub-wiring MSL2-2, and the third-2 sub wiring MSL3-2 corresponding to the (N+1)-th stage ST_N+1 may be replaced with the descriptions of FIG. 7.

Figure 9:
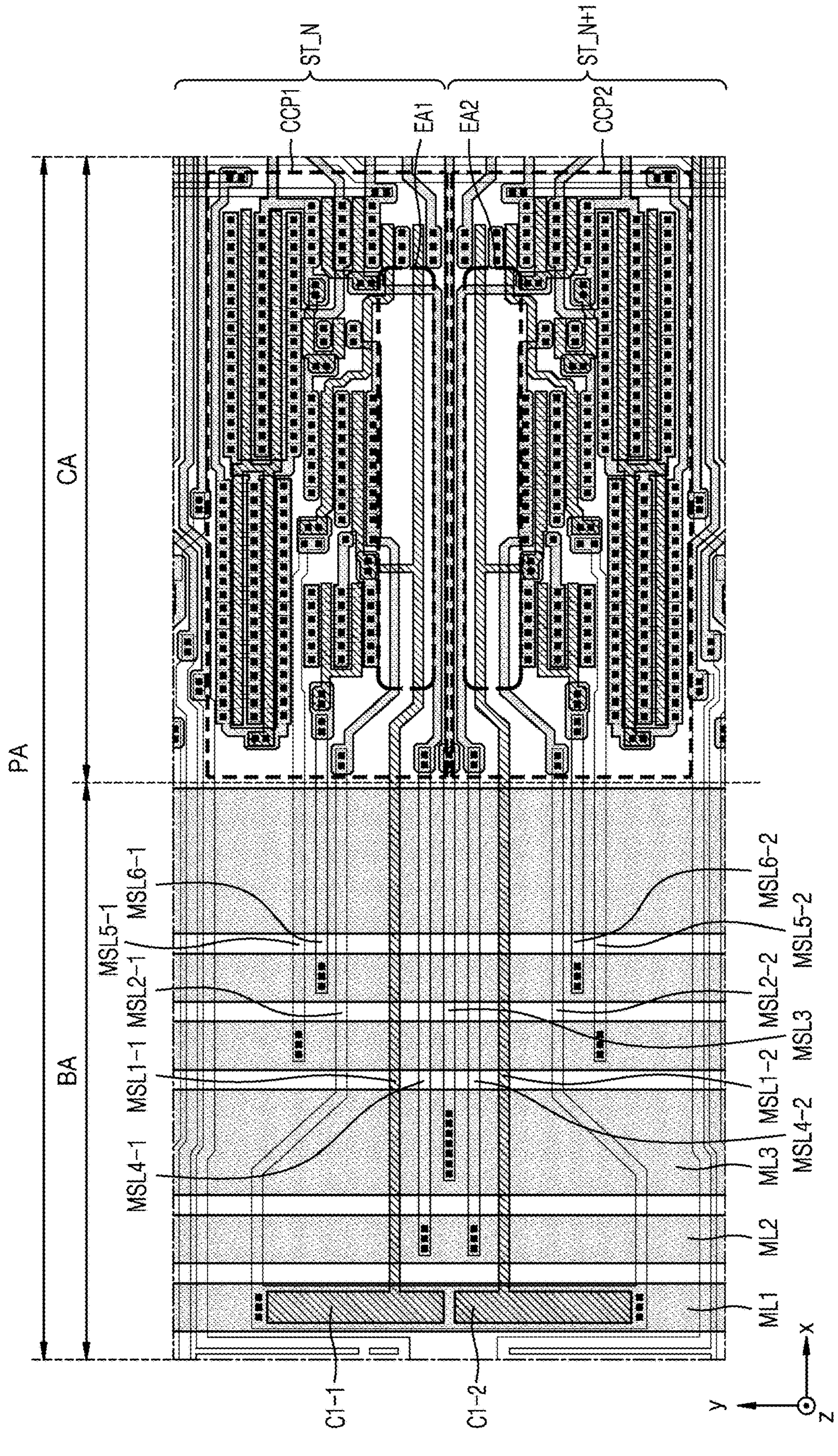
FIG. 9 is a schematic plan view of a specific example of FIG. 8.

FIG. 9 is a schematic plan view of a specific example of FIG. 8.

For reference, the display area DA may be disposed in the x axis direction (a right direction) in FIG. 9. For convenience of description, illustration of the display area DA is omitted. Although not illustrated in the drawing, the circuit arrangement area CA may be disposed between the wiring arrangement area BA and the display area DA in a plan view.

As illustrated in FIG. 9, each of the first transistor part CCP1 and the second transistor part CCP2 may include a plurality of switching elements (e.g., a plurality of transistors). The plurality of switching elements included in each of the first transistor part CCP1 and the second transistor part CCP2 may be the transistors according to the circuit diagram of FIG. 4 or FIG. 6. For convenience of description, description of the plurality of switching elements of FIG. 9 may be replaced with the descriptions of the circuit diagram of FIG. 4 or FIG. 6.

As illustrated in FIG. 9, in the circuit arrangement area CA, a first empty space EA1 formed in (or around) the first transistor part CCP1 and a second empty space EA2 formed in (or around) the second transistor part CCP2 are observed. The first empty space EA1 and the second empty space EA2 may denote empty spaces formed while the first-1 capacitor C1-1 moves to the wiring arrangement area BA.

Figure 10:
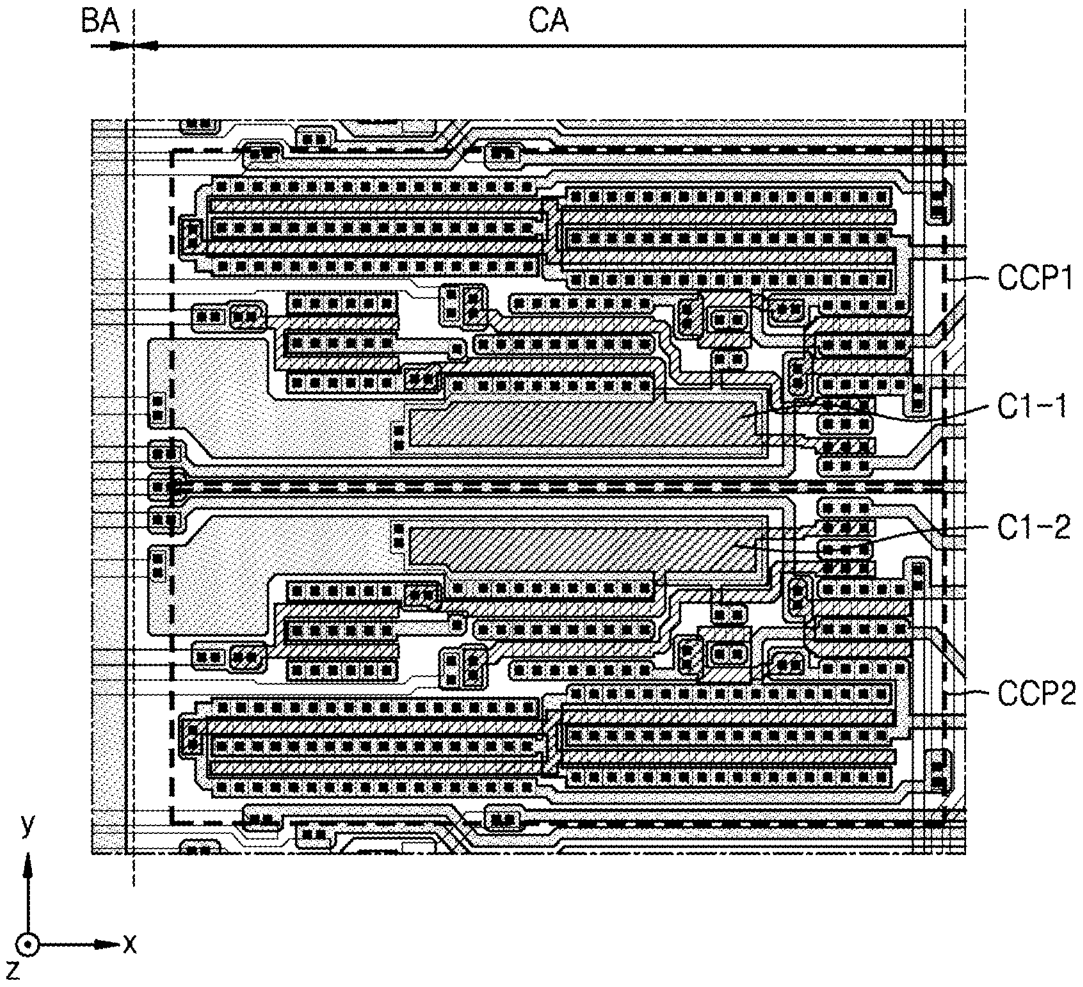
FIG. 10 is a schematic plan view of an example of a circuit arrangement area of a display apparatus according to a comparative example.

For convenience of description and comparison with FIG. 10 described herein, the first empty space EA1 is illustrated in FIG. 9. It is obviously known that, when the first empty space EA1 is utilized, a region occupied by the first transistor part CCP1 may be reduced. In other words, the plurality of switching elements included in the first transistor part CCP1 may be rearranged by utilizing the first empty space EA1, and as a result, the area of the peripheral area PA (or the circuit arrangement area CA) of the display panel 10 may be reduced. Because the area of the peripheral area PA (or the circuit arrangement area CA) of the display panel 10 is reduced, the area of a bezel of the display panel 10 may be reduced.

For convenience of description and comparison with FIG. 10, the second empty space EA2 is illustrated in FIG. 9. It is obviously known that, when the second empty space EA2 is utilized, a region occupied by the second transistor part CCP2 may be reduced. In other words, the plurality of switching elements included in the second transistor part CCP2 may be rearranged by utilizing the second empty space EA2, and as a result, the area of the peripheral area PA (or the circuit arrangement area CA) of the display panel 10 may be reduced. Because the area of the peripheral area PA (or the circuit arrangement area CA) of the display panel 10 is reduced, the area of a bezel of the display panel 10 may be reduced.

FIG. 10 is a schematic plan view of an example of a circuit arrangement area of a display apparatus according to a comparative example.

As illustrated in FIG. 10, in the case where the first-1 capacitor C1-1 and the first-2 capacitor C1-2 are disposed in the circuit arrangement area CA, the first empty space EA1 and the second empty space EA2 of FIG. 9 are not generated. Accordingly, it is revealed that an example of FIG. 10 does not utilize a space efficiently compared with an example of FIG. 9.

Figure 11:
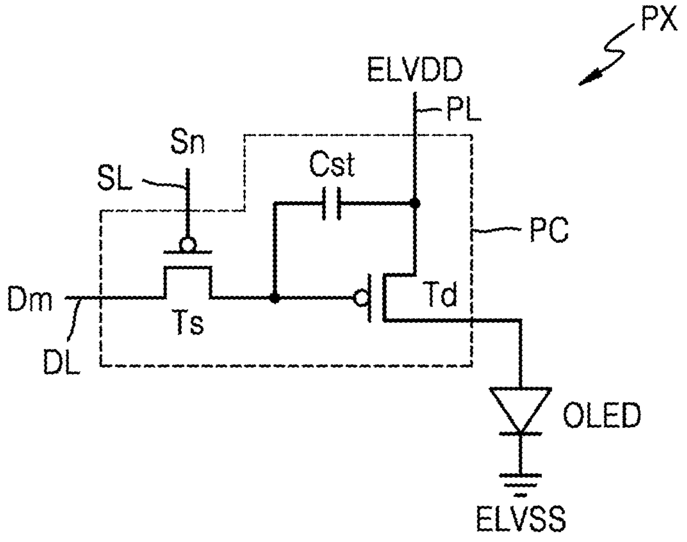
FIG. 11 is a schematic equivalent circuit diagram of a pixel of the display apparatus of FIG. 1.

FIG. 11 is a schematic equivalent circuit diagram of a pixel of the display apparatus of FIG. 1.

As illustrated in FIG. 11, each pixel PX includes a pixel circuit PC and an organic light-emitting element OLED connected to the pixel circuit PC, wherein the pixel circuit PC is connected to the scan line SL and the data line DL.

As an example, the pixel circuit PC includes a driving thin-film transistor Td, a switching thin-film transistor Ts, and a storage capacitor Cst. The switching thin-film transistor Ts is connected to the scan line SL and the data line DL, and configured to transfer a data signal Dm to the driving thin-film transistor Td according to a scan signal Sn, wherein the data signal Dm is input through the data line DL, and the scan signal Sn is input through the scan line SL.

For reference, a scan signal Sn may be a scan signal SC_N of FIGS. 4 and 6. A scan signal Sn may be a signal generated by the circuit of FIG. 4 or FIG. 6. A scan signal Sn may be a signal generated by the scan driver GP of FIG. 2. A scan signal Sn may be a signal generated by the circuit of FIG. 4 or FIG. 6 based on input signals generated by the controller CP of FIG. 2.

As an example, the storage capacitor Cst is connected to the switching thin-film transistor Ts and the driving voltage line PL and configured to store a voltage corresponding to a difference between a voltage transferred from the switching thin-film transistor Ts and a first power voltage ELVDD (or a driving voltage) supplied to the driving voltage line PL.

As an example, the driving thin-film transistor Td may be connected to the driving voltage line PL and the storage capacitor Cst and configured to control a driving current according to the voltage stored in the storage capacitor Cst, the driving current flowing from the driving voltage line PL to the organic light-emitting element OLED. The organic light-emitting element OLED may be configured to emit light having a preset brightness corresponding to the driving current.

The organic light-emitting element OLED may receive a second power voltage ELVSS (or a common voltage). As an example, the organic light-emitting element OLED may receive the second power voltage ELVSS (or the common voltage) through an opposite electrode (a cathode) and emit light having a preset brightness based on the driving current corresponding to a voltage difference between the first power voltage ELVDD (or the driving voltage) and the second power voltage ELVSS (or the common voltage).

Although it is described with reference to FIG. 11 that the pixel circuit PC includes two thin-film transistors and one storage capacitor, the disclosure is not limited thereto. As an example, the pixel circuit PC may not only include two or more storage capacitors but also include three or more thin-film transistors.

Figure 12:
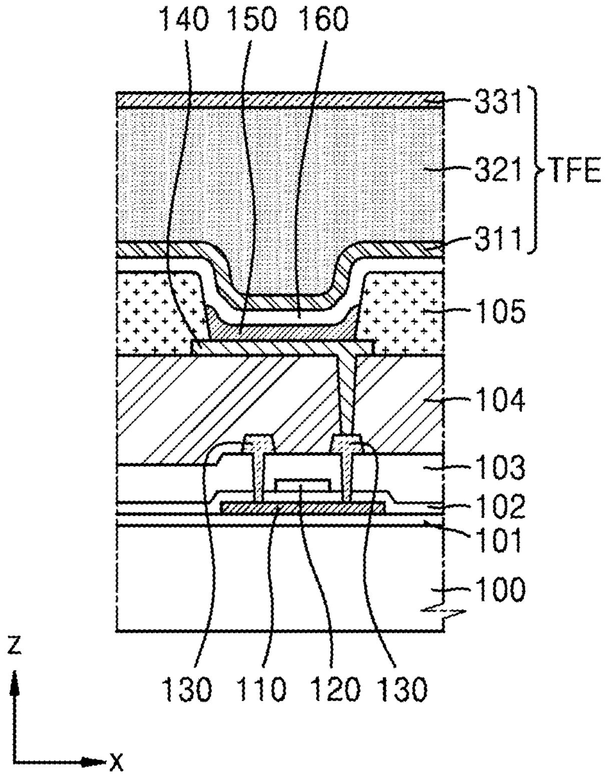
FIG. 12 is a schematic cross-sectional view of a portion of the display apparatus of FIG. 1.

FIG. 12 is a schematic cross-sectional view of a portion of the display apparatus of FIG. 1.

As described herein, the substrate 100 may include the display area DA and regions corresponding to the peripheral area PA outside the display area DA. The substrate 100 may include various flexible or bendable materials. As an example, the substrate 100 may include glass, metal, or polymer resin. In some aspects, the substrate 100 may include polymer resin such as, for example, polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including two layers each including the polymer resin, and a barrier layer including an inorganic material (such as, for example, silicon oxide, silicon nitride, and silicon oxynitride) between the two layers. However, various modifications may be made.

A buffer layer 101 may be disposed on the substrate 100. The buffer layer 101 may prevent impurity ions from diffusing, prevent penetration of moisture or external air, and serve as a barrier layer for planarizing a surface and/or a blocking layer. The buffer layer 101 may include silicon oxide, silicon nitride, or silicon oxynitride. In some aspects, the buffer layer 101 may support uniform crystallization of a semiconductor layer 110 by adjusting a rate in which heat is provided during a crystalizing process of forming the semiconductor layer 110.

The semiconductor layer 110 may be disposed on the buffer layer 101. The semiconductor layer 110 may include polycrystalline silicon and include a channel region, a source region, and a drain region, wherein the channel region is not doped with impurities, and the source region and the drain region are on two opposite sides of the channel region and doped with impurities. Here, impurities may vary depending on the type of a thin-film transistor and may be N-type impurities or P-type impurities. Although not illustrated in the drawing, the display apparatus according to an embodiment may further include another semiconductor layer disposed on a different layer.

A gate insulating layer 102 may be disposed on the semiconductor layer 110. The gate insulating layer 102 may be an element for securing insulation between the semiconductor layer 110 and a gate layer 120. The gate insulating layer 102 may include an inorganic material such as, for example, silicon oxide, silicon nitride, and/or silicon oxynitride, and be disposed between the semiconductor layer 110 and the gate layer 120. In some aspects, the gate insulating layer 102 may have a shape corresponding to the entire surface of the substrate 100 and have a structure in which contact holes are formed in preset portions of the gate insulating layer 102. As described herein, the insulating layer including the inorganic material may be formed by chemical vapor deposition (CVD) or atomic layer deposition (ALD). This is also applicable to embodiments below and modifications thereof.

The gate layer 120 may be disposed on the gate insulating layer 102. The gate layer 120 may be disposed at a position vertically overlaps the semiconductor layer 110 and may include at least one of molybdenum (Mo), aluminum (Al), platinum (Pt), palladium (Pd), silver (Ag), magnesium (Mg), gold (Au), nickel (Ni), neodymium (Nd), iridium (Ir), chrome (Cr), lithium (Li), calcium (Ca), titanium (Ti), tungsten (W), and copper (Cu). The gate layer 120 is described herein in detail. Although not illustrated in the drawing, the display apparatus according to an embodiment may further include another gate layer disposed on a different layer.

An interlayer insulating layer 103 may be disposed on the gate layer 120. The interlayer insulating layer 103 may cover the gate layer 120. The interlayer insulating layer 103 may include an inorganic material. As an example, the interlayer insulating layer 103 may include an oxide (such as a metal oxide) or a nitride (such as metal nitride), and the inorganic material may specifically include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$, may be ZnO or $ZnO_2$) and the like. In an embodiment, the interlayer insulating layer 103 may include a double structure of $SiO_x/SiN_y$ or $SiN_x/SiO_y$.

A conductive layer 130 may be disposed on the interlayer insulating layer 103. The conductive layer 130 may serve as an electrode connected to the source/drain regions of the semiconductor layer through a through hole included in the interlayer insulating layer 103.

The conductive layer 130 may include at least one of aluminum (Al), platinum (Pt), palladium (Pd), silver (Ag), magnesium (Mg), gold (Au), nickel (Ni), neodymium (Nd), and iridium (Ir), chrome (Cr), lithium (Li), calcium (Ca), molybdenum (Mo), titanium (Ti), tungsten (W), and copper (Cu). As an example, the conductive layer 130 may include a Ti layer, an Al layer, and/or a Cu layer. As an example, the conductive layer 130 may include a three-layered structure of Ti layer/Al layer/Ti layer.

Although not illustrated in the drawing, the display apparatus according to an embodiment may further include another conductive layer disposed on another layer. The other conductive layer may serve as, for example, a wiring layer serving as a wiring. The other conductive layer may include the same material as the conductive layer 130 and have the same layer structure as the conductive layer 130.

An organic insulating layer 104 may be disposed on the conductive layer 130. The organic insulating layer 104 may cover the upper surface of the conductive layer 130 and may be an organic insulating layer having a generally flat upper surface to serve as a planarization layer. The organic insulating layer 104 may include an organic material such as, for example, acrylic-based resin, benzocyclobutene (BCB), hexamethyldisiloxane (HMDSO) or the like. The organic insulating layer 104 may include a single layer or a multi-layer. However, various modifications may be made.

Although not illustrated in the drawing, the display apparatus according to an embodiment may further include another organic insulating layer disposed on a different layer. The other organic insulating layer may be disposed on the other conductive layer and may cover the upper surface of another conductive layer to serve as a planarization layer. The other organic insulating layer may include the same material as the organic insulating layer 104 and have the same layer structure as the organic insulating layer 104.

A pixel electrode 140 may be disposed on the organic insulating layer 104. Alternatively, the pixel electrode 140 may be disposed on the other organic insulating layer. However, for convenience of description, description is made on the assumption that the pixel electrode 140 is disposed on the organic insulating layer 104.

The pixel electrode 140 may be connected to the conductive layer 130 through a contact hole formed in the organic insulating layer 104. A display element may be disposed on the pixel electrode 140. As the display element, an organic light-emitting element OLED may be used. That is, the organic light-emitting element OLED may be disposed on, for example, the pixel electrode 140. The pixel electrode 140 may include a light-transmissive conductive layer and/or a reflective layer, wherein the light-transmissive conductive layer includes a light-transmissive conductive oxide such as, for example, $In_2O_3$, IZO or the like, and the reflective layer includes metal such as, for example, Al, Ag, the like. As an example, the pixel electrode 140 may have a three-layered structure of ITO layer/Ag layer/ITO layer.

A pixel-defining layer 105 may be disposed on the organic insulating layer 104 and disposed such that the pixel-defining layer 105 covers the edges of the pixel electrode 140. As an example, the pixel-defining layer 105 may cover the edges of the pixel electrode 140. The pixel-defining layer 105 includes an opening corresponding to the pixel, and the opening may be formed to expose at least the central portion of the pixel electrode 140. The opening may be defined by the pixel-defining layer 105.

The pixel-defining layer 105 may include an organic material such as, for example, polyimide or hexamethyldisiloxane (HMDSO). In some aspects, a spacer may be disposed on the pixel-defining layer 105. Although it is illustrated that the spacer is arranged in the peripheral area PA, the spacer may be arranged in the display area DA. The spacer (not illustrated) may be configured to prevent the organic light-emitting element OLED from being damaged by sagging of a mask during a manufacturing process that uses the mask. The spacer may include an organic insulating material and include a single layer or a multi-layer.

An intermediate layer 150 and an opposite electrode 160 may be disposed in the opening. The intermediate layer 150 may include a low-molecular weight material or a high-molecular weight material. In the case where the intermediate layer 150 includes a low-molecular weight material, the intermediate layer 150 may include a hole injection layer, a hole transport layer, an emission layer, an electron transport layer, and/or an electron injection layer. In the case where the intermediate layer 150 includes a high-molecular weight material, the intermediate layer 150 may generally have a structure including a hole transport layer and an emission layer.

The structure of the intermediate layer 150 is not limited thereto and may have various structures. As an example, at least one of layers constituting the intermediate layer 150 may be integrally formed like the opposite electrode 160. In another embodiment, the intermediate layer 150 may include a layer patterned to correspond to each of a plurality of pixel electrodes 140.

The opposite electrode 160 may include a light-transmissive conductive layer including a light-transmissive conductive oxide such as, for example, ITO, $In_2O_3$, or IZO. The pixel electrode 140 is used as an anode, and the opposite electrode 160 is used as a cathode. The polarities of the electrodes may be reversed.

The opposite electrode 160 may be disposed in the upper portion of the display area DA and disposed over the entire surface of the display area DA. That is, the opposite electrode 160 may be integrally formed such that the opposite electrode 160 covers the plurality of pixels. The opposite electrode may be in electrical contact with a common power supply line disposed in the peripheral area PA. As an example, the opposite electrode 160 may extend up to a partition wall.

A thin-film encapsulation layer TFE may cover the display area DA entirely. The thin-film encapsulation layer TFE may extend to the peripheral area PA such that the thin-film encapsulation layer TFE covers at least a portion of the peripheral area PA. The thin-film encapsulation layer TFE may extend up to the outside of the common power supply line.

The thin-film encapsulation layer TFE may include a first inorganic encapsulation layer 311, a second inorganic encapsulation layer 331, and an organic encapsulation layer 321 between the first inorganic encapsulation layer 311 and the second inorganic encapsulation layer 331. The first and second inorganic encapsulation layers 311 and 331 may include at least one inorganic material among aluminum oxide, titanium oxide, tantalum oxide, hafnium oxide, zinc oxide, silicon oxide, silicon nitride, silicon oxynitride, and the like. The first and second inorganic encapsulation layers 311 and 331 may include a single layer or a multi-layer including the above materials. The first and second inorganic encapsulation layers 311 and 331 may include the same material or different materials from each other.

The thickness of the first inorganic encapsulation layer 311 may be different from the thickness of the second inorganic encapsulation layer 331. The thickness of the first inorganic encapsulation layer 311 may be greater than the thickness of the second inorganic encapsulation layer 331. Alternatively, the thickness of the second inorganic encapsulation layer 331 may be greater than the thickness of the first inorganic encapsulation layer 311, or the thickness of the first inorganic encapsulation layer 311 may be the same as the thickness of the second inorganic encapsulation layer 331.

The organic encapsulation layer 321 may include a monomer-based material or a polymer-based material. The polymer-based material may include an acryl-based resin, an epoxy-based resin, polyimide, and polyethylene. As an example, the organic encapsulation layer 321 may include acrylate.

A partition wall (not illustrated) may be disposed in the peripheral area PA of the substrate 100. As an example, the partition wall (not illustrated) may be disposed to surround the display area DA and may prevent the organic encapsulation layer 321 of the thin-film encapsulation layer TFE from overflowing to the outside of the substrate 100.

In another embodiment, the thin-film encapsulation layer TFE may be replaced by a cover member covering the display area DA entirely. The cover member may be disposed to not only cover the display area DA but also at least a portion of the peripheral area PA. The cover member may include a rigid member (e.g., glass and the like). In the case where the thin-film encapsulation layer TFE is replaced by the cover member, the partition wall (not illustrated) may be omitted. Depending on cases, a transparent filler may be disposed between the cover member and the opposite electrode 160.

Figure 13:
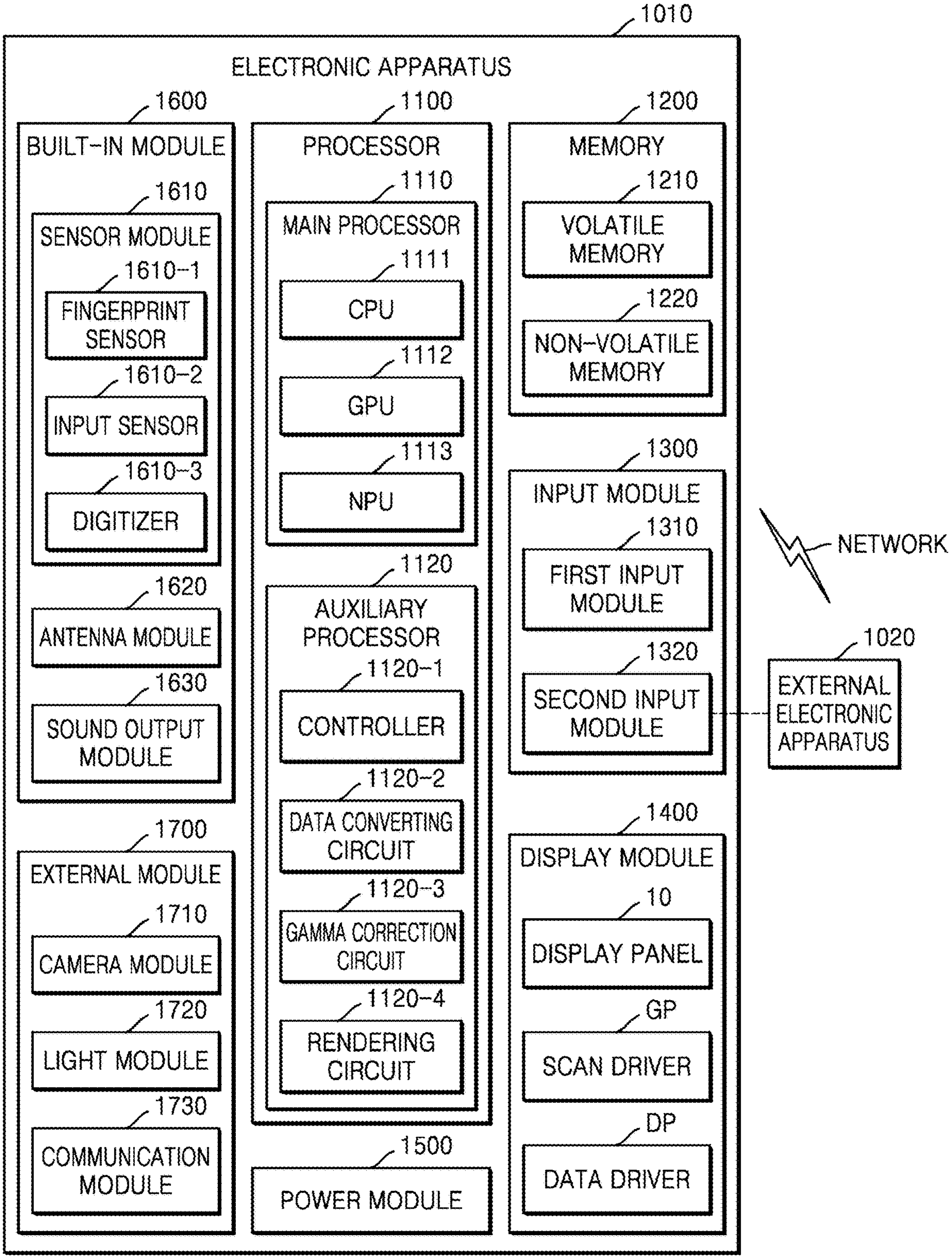
FIG. 13 is a block diagram of an electronic apparatus according to embodiments.

FIG. 13 is a block diagram of an electronic apparatus 1010 according to embodiments.

The electronic apparatus 1010 may output various information through a display module 1400 within an operating system. In an example in which a processor 1100 executes an application stored in a memory 1200, the display module 1400 provides application information to a user through the display panel 10.

The processor 1100 obtains an external input through an input module 1300 or a sensor module 1610 and executes an application corresponding to the external input. As an example, in the case where a user selects a camera icon displayed in the display panel 10, the processor 1100 obtains a user's input through an input sensor 1610-2 and activates a camera module 1710. The processor 1100 transfers image data corresponding to a captured image obtained through the camera module 1710 to the display module 1400. The display module 1400 may display an image corresponding to the captured image through the display panel 10.

In another example, in the case where personal information authentication is executed by the display module 1400, a fingerprint sensor 1610-1 obtains input fingerprint information as input data. The processor 1100 compares input data obtained through the fingerprint sensor 1610-1 with authentication data stored in the memory 1200 and executes an application according to the comparison result. The display module 1400 may display executed information through the display panel 10 according to the logic of the application.

As another example, in the case where a music streaming icon displayed in the display module 1400 is selected, the processor 1100 obtains a user input through the input sensor 1610-2 and activates a music streaming application stored in the memory 1200. In an example in which a music execution command is input in the music streaming application, the processor 1100 activates a sound output module 1630 and provides a user with sound information matching the music execution command.

In the above, an operation of the electronic apparatus 1010 is briefly described. Hereinafter, the construction of the electronic apparatus 1010 is described in detail. Some of elements of the electronic apparatus 1010 described herein may be integrated and provided as one construction, or one construction may be separated into two or more constructions and provided.

Referring to FIG. 13, the electronic apparatus 1010 may communicate with an external electronic apparatus 1020 through a network (e.g., a short-range wireless communication network or a long-range wireless communication network). In an embodiment, the electronic apparatus 1010 may include the processor 1100, the memory 1200, the input module 1300, the display module 1400, the power module 1500, a built-in module 1600, and an external module 1700. In an embodiment, in the electronic apparatus 1010, at least one of the above-described elements may be omitted, or one or more other elements may be added. In an embodiment, some (e.g., the sensor module 1610, an antenna module 1620, or the sound output module 1630) of the elements may be integrated into another element (e.g., the display module 1400).

The processor 1100 may execute software to control at least one other element (e.g., a hardware or software element) of the electronic apparatus 1010 connected to the processor 1100 and perform various data processing or operations. In an embodiment, as at least part of data processing or operation, the processor 1100 may store commands or data received from another element (e.g., the input module 1300, the sensor module 1610, or a communication module 1730) in a volatile memory 1210, and process commands and data stored in the volatile memory 1210, and result data may be stored in a non-volatile memory 1220.

The processor 1100 may include a main processor 1110 and an auxiliary processor 1120. The main processor 1110 may include at least one of a central processing unit (CPU) 111-1 and an application processor (AP). The main processor 1110 may further include at least one of a graphic processing unit (GPU) 1110-2, a communication processor (CP), and an image signal processor (ISP). The main processor 1110 may further include a neural processing unit (NPU) 1110-3. The NPU is a processor specialized in processing artificial intelligence models, and the artificial intelligence models may be created through machine learning. The artificial intelligence models may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited to the examples described herein. The artificial intelligence models may additionally or alternatively include a software structure in addition to a hardware structure. At least two of the processing units and processors described herein may be implemented as a single integrated configuration (e.g., a single chip) or each may be implemented as an independent configuration (e.g., multiple chips).

The auxiliary processor 1120 may include the controller 1120-1. The controller 1120-1 may include an interface conversion circuit and a timing control circuit. The controller 1120-1 receives an image signal from the main processor 1110, converts a data format of the image signal to match an interface specification with the display module 1400, and outputs the image data. The controller 1120-1 may output various control signals supportive of driving the display module 1400.

The auxiliary processor 1120 may further include the controller 1120-1, a data converting circuit 1120-2, a gamma correction circuit 1120-3, a rendering circuit 1120-4, and the like. The data converting circuit 1120-2 may receive image data from the controller 1120-1, compensate for image data to display an image at a desired brightness according to the characteristics of the electronic apparatus 1010 or a user's setting, or convert image data to reduce power consumption or compensate for an afterimage. The gamma correction circuit 1120-3 may convert image data or a gamma reference voltage and the like such that an image displayed by the electronic apparatus 1010 has a desired gamma characteristic. The rendering circuit 1120-4 may receive image data from the controller 1120-1 and render the image data by taking into account a pixel arrangement of the display panel 10 applied to the electronic apparatus 1010. At least one of the data converting circuit 1120-2, the gamma correction circuit 1120-3, and the rendering circuit 1120-4 may be integrated into another element (e.g., the main processor 1110 or the controller 1120-1). At least one of the data converting circuit 1120-2, the gamma correction circuit 1120-3, and the rendering circuit 1120-4 may be integrated into a data driver DP described herein.

The memory 1200 may store various data used by at least one element (e.g., the processor 1100 or the sensor module 1610) of the electronic apparatus 1010, and input data or output data regarding commands related thereto. The memory 1200 may include at least one of the volatile memory 1210 and the non-volatile memory 1220.

The input module 1300 may receive commands or data to be used in the element (e.g., the processor 1100, the sensor module 1610, or the sound output module 1630) of the electronic apparatus 1010, from the outside (e.g., a user or the external electronic apparatus 1020) of the electronic apparatus 1010.

The input module 1300 may include a first input module 1310 receiving commands or data from a user, and a second input module 1320 receiving commands or data from the external electronic apparatus 1020. The first input module 1310 may include a microphone, a mouse, a keyboard, a key (e.g., a button), or a pen (e.g., a passive pen or an active pen). The second input module 1320 may support a designated protocol that may be connected to the external electronic apparatus 1020 through a wired line or wirelessly. In an embodiment, the second input module 1320 may include a high definition multimedia interface (HDMI), a universal serial bus (USB) interface, a secure digital (SD) card interface, or an audio interface. The second input module 1320 may include a connector that is physically connectable to the external electronic apparatus 1020, for example, an HDMI connector, a USB connector, an SD card connector, or an audio connector (e.g., a headphone connector).

The display module 1400 may provide visual information to a user. The display module 1400 may include the display panel 10, the scan driver GP, and the data driver DP. The display module 1400 may further include a window, a chassis, and a bracket to protect the display panel 10.

The display module 1400, the display panel 10, the scan driver GP, and the like mentioned in FIG. 13 denote the display module 1400, the display panel 10, the scan driver GP, and the like mentioned in FIGS. 1 to 12. Accordingly, content that is identical or duplicated with the above-described content in the description of the display module 1400, display panel 10, scan driver GP, and the like may be omitted.

The display panel 10 may further include a light-emitting driver. The light-emitting driver outputs an emission control signal to the display panel 10 in response to a control signal received from the controller 1120-1. The light-emitting driver may be formed separately from the scan driver GP or may be integrated into the scan driver GP.

The scan driver GP receives a control signal from the controller 1120-1 and outputs scan signals to the display panel 10 in response to a control signal. As an example, a control signal generated by the controller 1120-1 and transferred to the scan driver GP may be a scan input signal for controlling the scan driver GP. A scan input signal may be an input signal applied to switching elements included in stages of the scan driver. As an example, an input signal may be a first input signal S1 to a sixth input signal S6 as described herein. In another example, an input signal may be an inverting signal INV_N applied to inverting elements.

The data driver DP receives a control signal from the controller 1120-1, converts image data into an analog voltage (e.g., a data voltage) in response to a control signal, and outputs data voltages to the display panel 10. As an example, a control signal generated by the controller 1120-1 and transferred to the data driver DP may be a data input signal for controlling the data driver DP.

The data driver DP may be integrated into another element (e.g., the controller 1120-1). The functions of the interface converting circuit and the timing control circuit of the controller 1120-1 may be integrated into the data driver DP.

The controller 1120-1 may generate a clock signal supportive of driving the scan driver GP. As an example, clock signals may be a first clock signal CK1 to a sixth clock signal CK6 transferred to each stage of the scan driver GP. Each stage of the scan driver GP may operate based on a clock signal corresponding to each stage.

The scan driver GP may generate a scan signal based on a scan input signal, a clock signal, and a scan input voltage. A scan signal may be transferred to a pixel circuit, and a thin-film transistor included in the pixel circuit may be driven based on a scan signal. A scan signal may be transferred to a gate included in the pixel circuit.

The display module 1400 may further include a light-emitting driver, a voltage generating circuit, and the like. The voltage generating circuit may output various voltages supportive of driving the display panel 10.

The power module 1500 supplies power to the elements of the electronic apparatus 1010. As an example, the power module 1500 may generate the first power voltage ELVDD and the second power voltage ELVSS. The power module 1500 may generate gate driving voltages (e.g., a gate high voltage and a gate low voltage) supportive of driving the scan driver GP.

As an example, the power module 1500 may denote a power generator, a power supply, and the like. As an example, the power module 1500 may include a battery charging a power voltage. The battery may include a non-rechargeable primary battery, a rechargeable secondary battery, or a fuel cell.

As an example, the power module 1500 may include a power management integrated circuit (PMIC). The PMIC supplies power optimized for each of the above-described modules and modules described herein.

As an example, the power module 1500 may include a wireless power transmission/reception member electrically connected to the battery. The wireless power transmission/reception member may include a plurality of coil-shaped antenna radiators.

The electronic apparatus 1010 may further include the built-in module 1600 and the external module 1700. The built-in module 1600 may include the sensor module 1610, the antenna module 1620, and the sound output module 1630. The external module 1700 may include the camera module 1710, a light module 1720, and the communication module 1730.

The sensor module 1610 may sense an input due to a user's body or an input due to a pen of the first input module 1310, and generate an electrical signal or data value corresponding to the input. The sensor module 1610 may include at least one of the fingerprint sensor 1610-1, the input sensor 1610-2, and a digitizer 1610-3.

The fingerprint sensor 1610-1 may generate a data value corresponding to a user's fingerprint. The fingerprint sensor 1610-1 may include one of an optical fingerprint sensor and a capacitive fingerprint sensor.

The input sensor 1610-2 may generate a data value corresponding to coordinate information of an input due to a user's body or an input due to a pen. The input sensor 1610-2 may generate a data value based on a change in electrostatic capacitance due to an input. The input sensor 1610-2 may sense an input due to a passive pen or transmit/receive data to/from an active pen.

The input sensor 1610-2 may measure biosignals such as, for example, blood pressure, moisture, or body fat. As an example, when a user touches a part of his or her body to a sensor layer or sensing panel and does not move for a preset period of time, the input sensor 1610-2 may detect a biosignal based on a change in an electric field caused by the part of his or her body and output information desired by the user to the display module 1400.

The digitizer 1610-3 may generate a data value corresponding to coordinate information of an input due to a pen. The digitizer 1610-3 may generate a data value based on a change in electromagnetism due to an input. The digitizer 1610-3 may sense an input due to a passive pen or transmit/receive data to/from an active pen.

At least one of the fingerprint sensor 1610-1, the input sensor 1610-2, and the digitizer 1610-3 may be implemented as a sensor layer formed on the display panel 10 through a successive process. The fingerprint sensor 1610-1, the input sensor 1610-2, and the digitizer 1610-3 may be disposed on the upper side of the display panel 10, and one, for example, the digitizer, of the fingerprint sensor 1610-1, the input sensor 1610-2, and the digitizer 1610-3 may be disposed on the lower side of the display panel 10.

At least two of the fingerprint sensor 1610-1, the input sensor 1610-2, and the digitizer 1610-3 may be integrated as one sensing panel through the same process. In the case where the at least two of the fingerprint sensor 1610-1, the input sensor 1610-2, and the digitizer 1610-3 are integrated as one sensing panel, the sensing panel may be disposed between the display panel 10 and the window disposed on the upper side of the display panel 10. In an embodiment, the sensing panel may be disposed on the window. The position of the sensing panel is not particularly limited.

At least one of the fingerprint sensor 1610-1, the input sensor 1610-2, and the digitizer 1610-3 may be built in the display panel 10. That is, at least one of the fingerprint sensor 1610-1, the input sensor 1610-2, and the digitizer 1610-3 may be simultaneously formed through a process of forming elements (e.g., the light-emitting element, the transistor, and the like) included in the display panel 10.

Besides, the sensor module 1610 may generate an electrical signal or data value corresponding to an inner state or an outer state of the electronic apparatus 1010. The sensor module 1610 may further include, for example, a gesture sensor, a gyro sensor, a pressure sensor, a magnetic sensor, an acceleration sensor, a grip sensor, a proximity sensor, a color sensor, an IR (infrared) sensor, a biometric sensor, a temperature sensor, a humidity sensor, or an illuminance sensor.

The antenna module 1620 may include at least one antenna for transmitting signals or power to the outside, or receiving signals or power from the outside. In an embodiment, the communication module 1730 may transmit signals to an external electronic apparatus or receive signals from an external electronic apparatus through an antenna suitable for a communication method. An antenna pattern of the antenna module 1620 may be integrated in one construction (e.g., the display panel 10) of the display module 1400 or the input sensor 1610-2 and the like.

The sound output module 1630 is an apparatus for outputting sound signals to the outside of the electronic apparatus 1010. The sound output module 1630 may include, for example, a speaker used for general purposes such as, for example, multimedia playback or recording playback, and a receiver used exclusively for phone reception. In an embodiment, the receiver may be formed integrally with or separate from the speaker. A sound output pattern of the sound output module 1630 may be integrated in the display module 1400.

The camera module 1710 may capture still images and moving images. In an embodiment, the camera module 1710 may include one or more lenses, an image sensor, or an image signal processor. The camera module 1710 may further include an infrared camera capable of measuring the presence or absence of a user, a user's location, the user's line of sight, and the like.

The light module 1720 may provide light. The light module 1720 may include a light-emitting diode or a xenon lamp. The light module 1720 may operate in association with the camera module 1710 or independently.

The communication module 1730 may support establishment of a wired or wireless communication channel between the electronic apparatus 1010 and the external electronic apparatus 1020, and support performance of communication through the established communication channel. The communication module 1730 may include one or both of a wireless communication module, such as, for example, a cellular communication module, a short-range wireless communication module, or a global navigation satellite system (GNSS) communication module, and a wired communication module, such as, for example, a local area network (LAN) communication module, or a power line communication module. The communication module 1730 may communicate with the external electronic apparatus 1020 via a short-range communication network such as, for example, Bluetooth, WiFi direct, or infrared data association (IrDA), or a long-range communication network such as, for example, a cellular network, the Internet, or a computer network (e.g., a LAN or WAN). The various types of communication modules 1730 described herein may be implemented as one chip or as separate chips.

The input module 1300, the sensor module 1610, the camera module 1710, and the like may be utilized in controlling the operation of the display module 1400 in association with the processor 1100.

The processor 1100 outputs commands or data to the display module 1400, the sound output module 1630, the camera module 1710, or the light module 1720 based on input data received from the input module 1300. As an example, the processor 1100 may generate image data and output the image data to the display module 1400 in response to input data applied through a mouse or an active pen and the like, or generate command data and output the command data to the camera module 1710 or the light module 1720 in response to the input data. In an example in which input data is not received from the input module 1300 for a preset period of time, the processor 1100 may reduce power consumed by the electronic apparatus 1010 by converting an operation mode of the electronic apparatus 1010 into a low power mode or a sleep mode.

The processor 1100 outputs commands or data to the display module 1400, the sound output module 1630, the camera module 1710, or the light module 1720 based on sensing data received from the sensor module 1610. As an example, the processor 1100 compares authentication data applied by the fingerprint sensor 1610-1 with authentication data stored in the memory 1200 and then may execute an application according to the comparison result. The processor 1100 may execute commands or corresponding image data to the display module 1400 based on sensing data sensed by the input sensor 1610-2 or the digitizer 1610-3. In the case where the sensor module 1610 includes a temperature sensor, the processor 1100 may receive temperature data regarding temperature measured by the sensor module 1610, and further perform brightness correction and the like for image data based on the temperature data.

The processor 1100 may receive measurement data regarding the presence or absence of a user, a user's location, the user's line of sight, and the like from the camera module 1710. The processor 1100 may further perform brightness correction and the like for image data based on the measurement data. As an example, the processor 1100 which has determined the presence or absence of a user through an input from the camera module 1710 may output image data whose brightness has been corrected through the data converting circuit 1120-2 or the gamma correction circuit 1120-3, to the display module 1400.

Some of the above elements may be connected to each other via a communication method between peripheral devices, such as, for example, a bus, general purpose input/output (GPIO), a serial peripheral interface (SPI), a mobile industry processor interface (MIPI), or an ultra path interconnect (UPI) link, to exchange signals (e.g., commands or data) with each other. The processor 1100 may communicate with the display module 1400 using a designated interface, for example, using one of the above-described communication methods. The communication method is not limited to the above communication methods.

The electronic apparatus 1010 according to various embodiments may be various apparatuses. The electronic apparatus 1010 may include, for example, at least one of a portable communication device (e.g., a smartphone), a computer device, a portable multimedia device, a portable medical device, a camera, a wearable device, or a home appliance device. The electronic apparatus 1010 according to an embodiment is not limited to the above-described devices.

In an embodiment, the electronic apparatus 1010 may include the controller 1120-1, the power module, and the display module. The display module may include the display panel and the scan driver GP. The controller 1120-1 may generate a scan input signal supportive of driving the scan driver GP. The power module may generate a scan input voltage supportive of driving the scan driver GP under control of the processor or the controller 1120-1. As an example, the scan input voltage may be a gate driving voltage.

The display panel may be divided into the display area in which the pixel circuit is disposed, and the peripheral area outside the display area. As described herein, an area in which images are displayed may be the display area, and an area other than the display area, in which images are not displayed may be the peripheral area.

The scan driver GP may be disposed in the peripheral area, may receive a scan input signal from the controller 1120-1, and receive a scan input voltage from the power module. The scan driver GP may generate or output a scan signal based on a scan input signal and/or a scan input voltage. A scan signal may be transferred from the scan driver GP to the pixel circuit.

In an embodiment, the scan driver GP may include at least one capacitor. At least one capacitor may include one electrode and the other electrode. As an example, one electrode may be a signal line transferring at least one of a scan input signal and a scan input voltage. As an example, one electrode may be at least a portion of a signal line transferring at least one of a scan input signal and a scan input voltage.

A signal line may be a wiring (e.g., the first wiring ML1) to which a sixth input signal S6 is transferred. Alternatively, a signal line may be a wiring to which a scan input voltage is transferred.

As an example, the other electrode may overlap the one electrode. The other electrode may overlap a signal line transferring at least one of a scan input signal and a scan input voltage. As an example, the other electrode may overlap at least a portion of a signal line transferring at least one of a scan input signal and a scan input voltage.

In an embodiment, the peripheral area may include the wiring arrangement area in which wirings are disposed, and the circuit arrangement area in which at least one transistor is disposed between the display area and the wiring arrangement area. As an example, at least one capacitor may be disposed in the wiring arrangement area.

In an embodiment, in a plan view, at least one capacitor may be apart from at least one transistor in the first direction, and a signal line may extend in the second direction crossing the first direction.

In some aspects, the display module included in the electronic apparatus may include characteristics of the display panel, the scan driver GP, and the data driver described with reference to FIGS. 1 to 12. Those of ordinary skill in the art would easily understand that the descriptions of the display panel, the scan driver GP, and the data driver described with reference to FIGS. 1 to 12 are applicable to the display module of FIG. 13.

Unless described otherwise, it should be considered that description of features or aspects in each embodiment is generally usable for other similar features or aspects of another embodiment. Accordingly, as is apparent to those skilled in the art, features or elements described in connection with a particular embodiment may be combined with features or elements described in connection with other embodiments.

According to an embodiment having the above configuration, the display apparatus for implementing a slim bezel and the electronic apparatus including the display apparatus may be provided. However, the scope of the disclosure is not limited by this effect.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a substrate comprising a display area and a peripheral area surrounding the display area;

a pixel circuit disposed in the display area; and a scan driver disposed in the peripheral area, electrically connected to the pixel circuit, and comprising:

a sensing transistor, a first wiring electrically connected to a source electrode of the sensing transistor, and a first capacitor electrically connected to the source electrode of the sensing transistor and a gate electrode of the sensing transistor, wherein:

the peripheral area comprises:

a wiring arrangement area in which wirings are disposed; and a circuit arrangement area in which at least one transistor is disposed, wherein the circuit arrangement area is between the display area and the wiring arrangement area, the first capacitor is disposed in the wiring arrangement area, the sensing transistor is disposed in the circuit arrangement area, and the first capacitor comprises:
a first electrode electrically connected to the first wiring; and
a second electrode electrically connected to the gate electrode of the sensing transistor.

2. The display apparatus of claim 1, wherein the first electrode is the first wiring.

3. The display apparatus of claim 2, wherein a portion of the first wiring overlaps the second electrode.

4. The display apparatus of claim 2, wherein a portion of the first wiring and the second electrode are vertically apart from each other.

5. The display apparatus of claim 2, wherein:
the first electrode is a lower electrode, and
the second electrode is an upper electrode.

6. The display apparatus of claim 3, wherein an insulating material is disposed between the first electrode and the second electrode.

7. The display apparatus of claim 2, wherein, in a plan view, the first capacitor is apart from the sensing transistor in a first direction.

8. The display apparatus of claim 7, wherein the first wiring extends in a second direction crossing the first direction.

9. The display apparatus of claim 7, wherein the second electrode comprises:
a first portion overlapping the first wiring in a plan view; and
a second portion electrically connecting the first portion to the gate electrode of the sensing transistor.

10. The display apparatus of claim 9, wherein:
the first portion extends in a direction in which the first wiring extends, and
the second portion extends in the first direction.

11. The display apparatus of claim 10, wherein:
a width of the first portion in the first direction is greater than a width of the second portion in a second direction, and
the second direction crosses the first direction.

12. A display apparatus comprising:
a substrate comprising a display area and a peripheral area surrounding the display area;
a pixel circuit disposed in the display area; and
a scan driver disposed in the peripheral area, electrically connected to the pixel circuit, and comprising:
a sensing transistor,
a first wiring electrically connected to a source electrode of the sensing transistor, and
a first capacitor electrically connected to the source electrode of the sensing transistor and a gate electrode of the sensing transistor,
wherein the first capacitor comprises:
a first electrode configured to receive a control signal from a controller, and
a second electrode electrically connected to the gate electrode of the sensing transistor,
wherein the first electrode is the first wiring.

13. The display apparatus of claim 12, wherein:
the peripheral area comprises:
a wiring arrangement area in which wirings are disposed, and
a circuit arrangement area in which at least one transistor is disposed between the display area and the wiring arrangement area,
the first capacitor is disposed in the wiring arrangement area, and
the sensing transistor is disposed in the circuit arrangement area.

14. The display apparatus of claim 12, wherein a portion of the first wiring overlaps the second electrode.

15. The display apparatus of claim 12, wherein a portion of the first wiring and the second electrode are vertically apart from each other.

16. The display apparatus of claim 12, wherein, in a plan view, the first capacitor is apart from the sensing transistor in a first direction.

17. The display apparatus of claim 16, wherein the first wiring extends in a second direction crossing the first direction.

18. An electronic apparatus comprising:
a controller which generates a scan input signal;
a power module which generates a scan input voltage; and
a display module comprising a display panel and a scan driver,
wherein:
the display panel is divided into:
a display area in which a pixel circuit is disposed, and
a peripheral area surrounding the display area,
the scan driver is disposed in the peripheral area, receives the scan input signal and the scan input voltage, and outputs a scan signal to the pixel circuit, and
the scan driver comprises at least one capacitor comprising one electrode and another electrode, wherein the one electrode is a signal line which transfers at least one of the scan input signal and the scan input voltage, and the other electrode overlaps at least a portion of the signal line.

19. The electronic apparatus of claim 18, wherein:
the peripheral area comprises:
a wiring arrangement area in which wirings are disposed, and
a circuit arrangement area in which at least one transistor is disposed, wherein the circuit arrangement area is between the display area and the wiring arrangement area, and
the at least one capacitor is disposed in the wiring arrangement area.

20. The electronic apparatus of claim 19, wherein, in a plan view, the at least one capacitor is apart from the at least one transistor in a first direction, and the signal line extends in a second direction crossing the first direction.

* * * * *